United States Patent
Homma et al.

(10) Patent No.: US 11,636,233 B2
(45) Date of Patent: Apr. 25, 2023

(54) COMMUNICATION TERMINAL SHARING IMAGE DATA WITH COUNTERPART COMMUNICATION TERMINAL, SYSTEM INCLUDING THE SAME, AND METHOD FOR CONTROLLING IMAGE CAPTURE

(71) Applicants: Takeshi Homma, Hyogo (JP); Hiroshi Hinohara, Kanagawa (JP); Shigeru Nakamura, Kanagawa (JP); Yuichi Kawasaki, Kanagawa (JP)

(72) Inventors: Takeshi Homma, Hyogo (JP); Hiroshi Hinohara, Kanagawa (JP); Shigeru Nakamura, Kanagawa (JP); Yuichi Kawasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/443,544

(22) Filed: Jul. 27, 2021

(65) Prior Publication Data

US 2022/0035958 A1 Feb. 3, 2022

(30) Foreign Application Priority Data

Jul. 29, 2020 (JP) .............................. JP2020-128601

(51) Int. Cl.
| | | |
|---|---|---|
| *G06F 21/62* | (2013.01) | |
| *H04N 1/44* | (2006.01) | |
| *G06F 3/048* | (2013.01) | |
| *G06F 21/84* | (2013.01) | |
| *G06F 3/0484* | (2022.01) | |
| *G06F 3/14* | (2006.01) | |

(52) U.S. Cl.
CPC ............ *G06F 21/84* (2013.01); *G06F 3/0484* (2013.01); *G06F 3/1454* (2013.01)

(58) Field of Classification Search
None
See application file for complete search history.

(56) References Cited

U.S. PATENT DOCUMENTS

| 7,254,682 B1 * | 8/2007 | Arbon ................. G06F 11/1451 714/E11.123 |
| 7,991,829 B2 * | 8/2011 | Takano ............... H04L 12/1818 713/168 |

(Continued)

FOREIGN PATENT DOCUMENTS

| JP | 2012-075024 | 4/2012 |
| JP | 2015-070543 | 4/2015 |
| JP | 2018-022468 | 2/2018 |

OTHER PUBLICATIONS

U.S. Appl. No. 16/935,211, filed Jul. 22, 2020, Yuichi Kawasaki, et al.

*Primary Examiner* — Jordany Nunez
(74) *Attorney, Agent, or Firm* — IPUSA, PLLC

(57) ABSTRACT

A communication terminal, a system, a method, and a control program stored in a non-transitory recording medium for controlling capturing of an image, each of which displays, on a display of the communication terminal, an image based on image data to be shared with a counterpart communication terminal; receives an instruction to prohibit capturing of a screen that includes the image based on the image data; and transmits, from the communication terminal to the counterpart communication terminal, information related to the instruction to prohibit capturing of the screen.

12 Claims, 26 Drawing Sheets

(56) References Cited

U.S. PATENT DOCUMENTS

| | | | | |
|---|---|---|---|---|
| 8,325,213 B2* | 12/2012 | Lamb | H04N 7/148 |
| | | | 348/14.08 |
| 8,750,472 B2* | 6/2014 | Shun | H04N 7/152 |
| | | | 379/93.21 |
| 9,003,557 B1* | 4/2015 | Leske | H04N 7/15 |
| | | | 709/224 |
| 9,009,785 B2* | 4/2015 | Apparao | H04L 63/105 |
| | | | 713/188 |
| 9,083,849 B2* | 7/2015 | Yoshida | H04N 7/15 |
| 9,344,677 B1* | 5/2016 | Leske | H04N 7/15 |
| 9,641,501 B2* | 5/2017 | Miyamoto | G06F 21/62 |
| 9,710,619 B2* | 7/2017 | Brady | G06F 21/10 |
| 10,083,422 B2* | 9/2018 | Rosati | G06Q 10/1053 |
| 10,255,022 B2* | 4/2019 | Takahashi | G06F 3/0484 |
| 10,742,843 B2* | 8/2020 | Judd | H04N 1/00384 |
| 10,762,231 B2* | 9/2020 | Walker | G06F 21/602 |
| 10,931,676 B2* | 2/2021 | Pantazelos | H04N 7/155 |
| 11,036,688 B2* | 6/2021 | Dhanabalan | H04W 12/08 |
| 2013/0258042 A1* | 10/2013 | Shun | H04N 7/152 |
| | | | 348/E7.083 |
| 2014/0253668 A1* | 9/2014 | Yoshida | H04N 7/15 |
| | | | 348/14.07 |
| 2014/0354663 A1* | 12/2014 | Takahashi | G06F 40/134 |
| | | | 345/530 |
| 2015/0271013 A1* | 9/2015 | Singh | H04L 12/1813 |
| | | | 709/223 |
| 2016/0170953 A1* | 6/2016 | Maddali | G06F 16/986 |
| | | | 715/234 |
| 2016/0210107 A1* | 7/2016 | Takahashi | H04N 21/4828 |
| 2018/0027031 A1 | 1/2018 | Kodaira | |
| 2018/0082255 A1* | 3/2018 | Rosati | G06Q 10/1053 |
| 2018/0083978 A1* | 3/2018 | Pantazelos | G06V 40/172 |
| 2018/0089625 A1* | 3/2018 | Rosati | G06Q 10/063114 |
| 2020/0036863 A1* | 1/2020 | Judd | H04N 1/00925 |
| 2020/0177742 A1* | 6/2020 | Homma | H04L 67/141 |
| 2020/0210136 A1* | 7/2020 | Kubo | H04N 7/155 |
| 2020/0278823 A1 | 9/2020 | Kawasaki et al. | |
| 2020/0296145 A1 | 9/2020 | Horiuchi et al. | |
| 2020/0296146 A1 | 9/2020 | Hinohara et al. | |
| 2021/0026509 A1 | 1/2021 | Homma et al. | |
| 2021/0055904 A1 | 2/2021 | Hinohara et al. | |
| 2021/0092012 A1* | 3/2021 | Singh | H04L 67/10 |
| 2021/0092170 A1 | 3/2021 | Takahashi et al. | |
| 2021/0126955 A1 | 4/2021 | Nagaoka et al. | |
| 2021/0133055 A1 | 5/2021 | Nakamura et al. | |

* cited by examiner

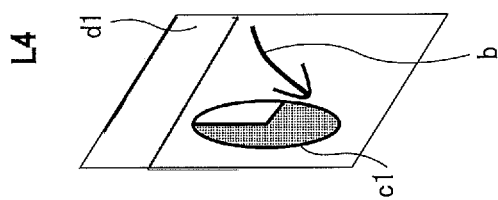
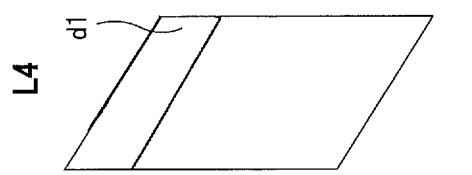
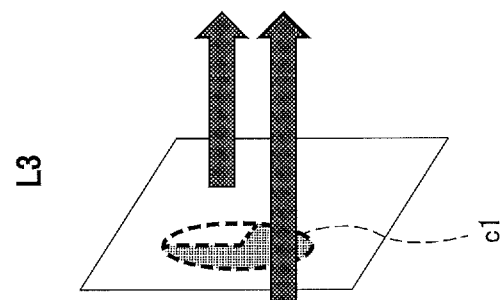
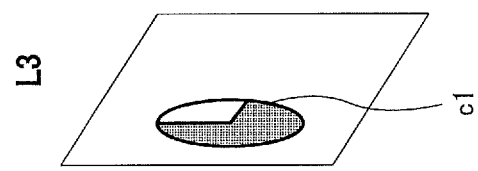
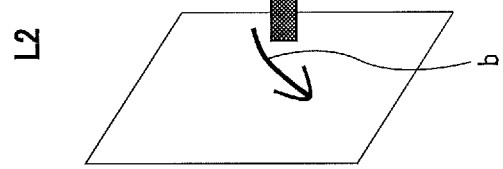
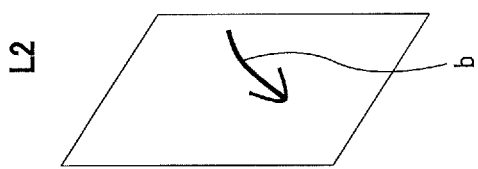
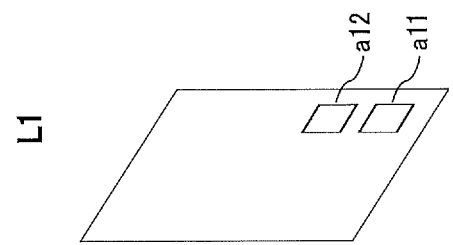
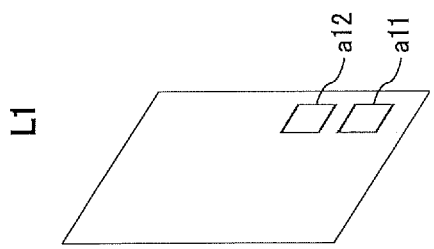
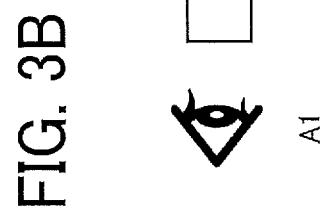
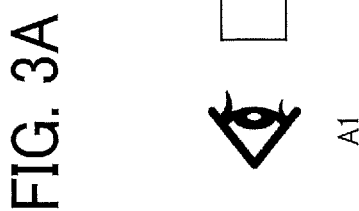
FIG. 3A
FIG. 3B

FIG. 8B

Id : "sr003"
DistId : "pag01"
Operation Type : "Add"
Date Type : "Stroke"
Date : "(2,2), (2,4), (3,6), (2,9)"

FIG. 9A

| MEETING ID | DOCUMENT ID | CONFIDENTI-ALITY RANGE | CONFIDENTIAL PAGE NUMBER |
|---|---|---|---|
| M001 | D001 | ALL | ALL(1-20) |
| M002 | D002 | PARTIAL | 3,5,6,15,17,28 |
| M003 | D003 | NONE | NONE(-) |
| ... | ... | ... | ... |

FIG. 9B

| MEETING ID | DOCUMENT ID | CONFIDENTI-ALITY RANGE | CONFIDENTIAL PAGE NUMBER |
|---|---|---|---|
| M001 | D001 | ALL | ALL(1-20) |
| M002 | D002 | PARTIAL | 3,5,6,15,17,28 |
| M003 | D003 | NONE | NONE(-) |
| ... | ... | ... | ... |

FIG. 10A

| TERMINAL ID | PASSWORD |
|:---:|:---:|
| 01aa | aaaa |
| 01ab | abab |
| 01ba | baba |
| ... | ... |

FIG. 10B

| TERMINAL ID | DESTINATION NAME | OPERATION STATE | RECEPTION TIME | TERMINAL IP ADDRESS |
|---|---|---|---|---|
| 01aa | TERMINAL AA, TOKYO BRANCH, JAPAN | ON-LINE (COMMUNICATION AVAILABLE) | 2020.6.19.13:40 | 1.2.1.3 |
| 01ab | MR. AB, TOKYO BRANCH, JAPAN | ON-LINE (COMMUNICATING) | 2020.6.18.12:00 | 1.2.1.4 |
| 01ac | MS. AC, TOKYO BRANCH, JAPAN | OFF-LINE | 2020.6.18.12:30 | 1.2.1.5 |
| ... | ... | ... | ... | ... |
| 01ba | TERMINAL BA, BEIJING BRANCH, CHINA | ON-LINE (COMMUNICATION AVAILABLE) | 2020.6.19.13:45 | 1.2.2.3 |
| 01bb | MR. BB, BEIJING BRANCH, CHINA | ON-LINE (COMMUNICATION TEMPORARILY INTERRUPTED) | 2020.6.19.13:50 | 1.2.2.4 |
| ... | ... | ... | ... | ... |
| 01ca | TERMINAL CA, WASHINGTON D.C. BRANCH, US | OFF-LINE | 2020.6.19.12:45 | 1.3.1.3 |
| 01cb | MS. CB, WASHINGTON D.C. BRANCH, US | ON-LINE (COMMUNICATING) | 2020.6.19.13:55 | 1.3.1.4 |
| ... | ... | ... | ... | ... |
| 01da | TERMINAL DA, BERLIN BRANCH, EUROPE | ON-LINE (COMMUNICATING) | 2020.6.17.12:45 | 1.3.2.3 |
| 01db | MR. DB, BERLIN BRANCH, EUROPE | ON-LINE (COMMUNICATION AVAILABLE) | 2020.6.19.12:45 | 1.3.2.4 |
| ... | ... | ... | ... | ... |

FIG. 11A

| TERMINAL ID OF SOURCE TERMINAL | TERMINAL IDS OF DESTINATION CANDIDATE TERMINALS |
|---|---|
| 01aa | 01ab,⋯,01ba,01bb,⋯,01ca,01cb,01da,01db,⋯ |
| 01ab | 01aa,01ca,01cb,01da |
| ⋮ | ⋮ |
| 01ba | 01aa,01ab,01ca,01cb,01da,01db |
| ⋮ | ⋮ |
| 01da | 01aa,01ab,01ba,⋯,01ca,01cb,⋯,01db |

FIG. 11B

| SESSION ID | RELAY DEVICE ID | SOURCE TERMINAL ID | DESTINATION TERMINAL ID | DELAY TIME (ms) | DELAY INFORMATION RECEPTION TIME |
|---|---|---|---|---|---|
| se01 | 111a | 01aa | 01db | 200 | 2020.6.19.13:41 |
| se02 | 111a | 01ba | 01cb | 50 | 2020.6.19.12:01 |
| ⋮ | ⋮ | ⋮ | ⋮ | ⋮ | ⋮ |

FIG. 11C

| RELAY DEVICE ID | OPERATION STATE | RECEPTION TIME | RELAY DEVICE IP ADDRESS | MAXIMUM DATA TRANSMISSION SPEED (Mbps) |
|---|---|---|---|---|
| 111a | ON-LINE | 2019.4.10.13:00 | 1.2.1.2 | 100 |
| 111b | OFF-LINE | 2019.4.10.13:10 | 1.2.2.2 | 1000 |
| 111c | ON-LINE | 2019.4.10.13:20 | 1.3.1.2 | 100 |
| 111d | ON-LINE | 2019.4.10.13:30 | 1.3.2.2 | 10 |

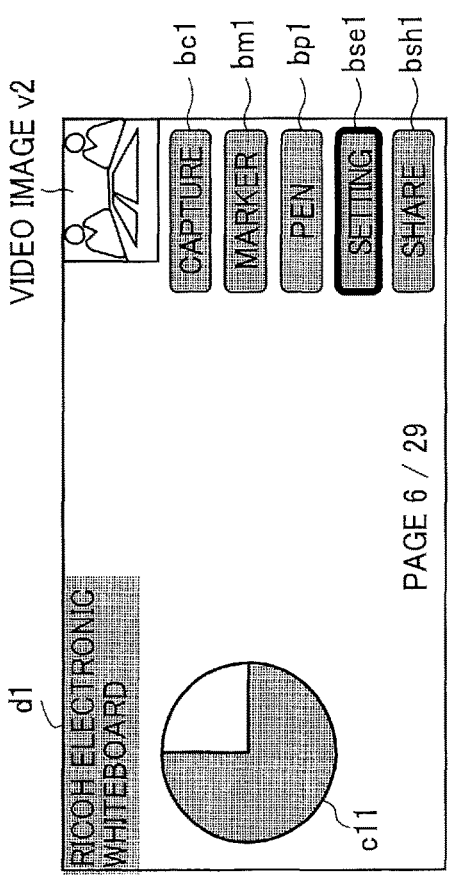
FIG. 21A
FIG. 21B
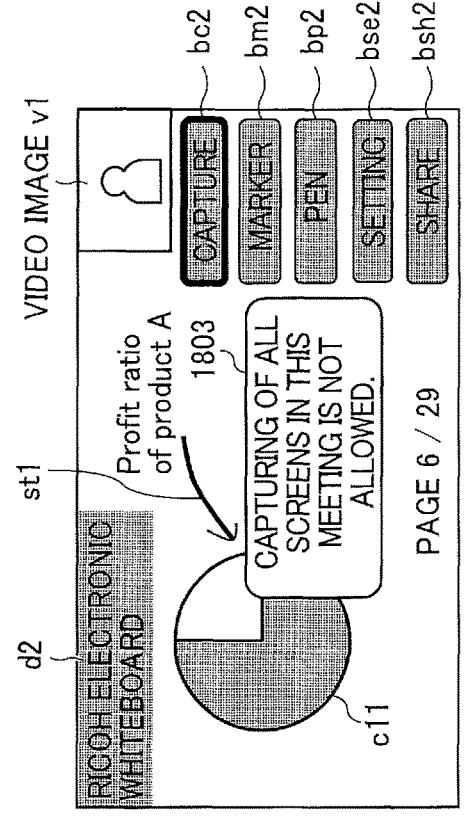
FIG. 21C
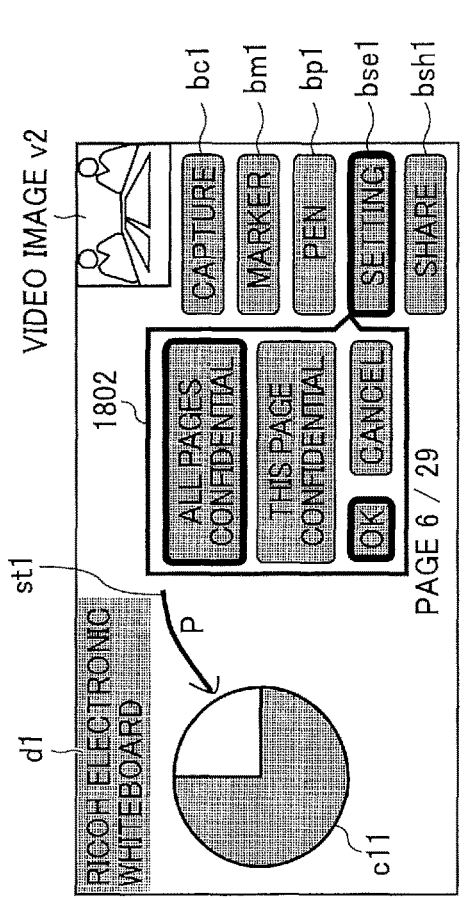
FIG. 21D

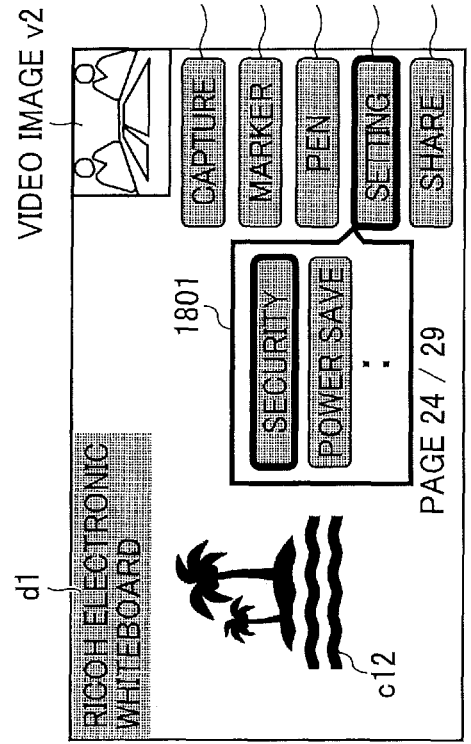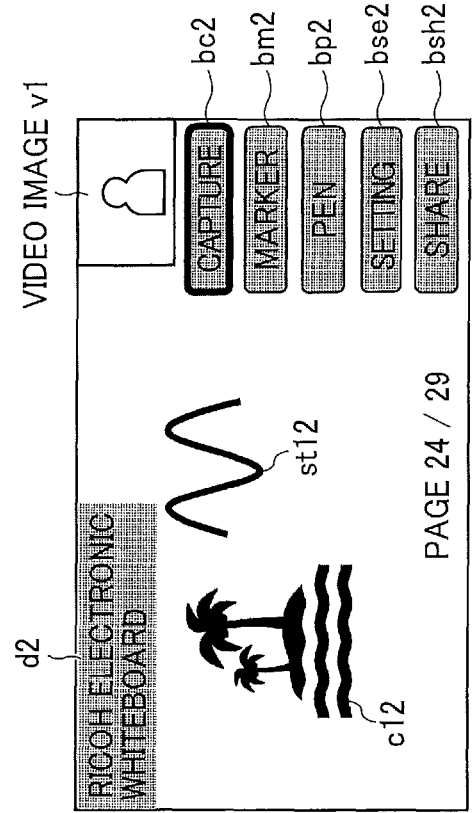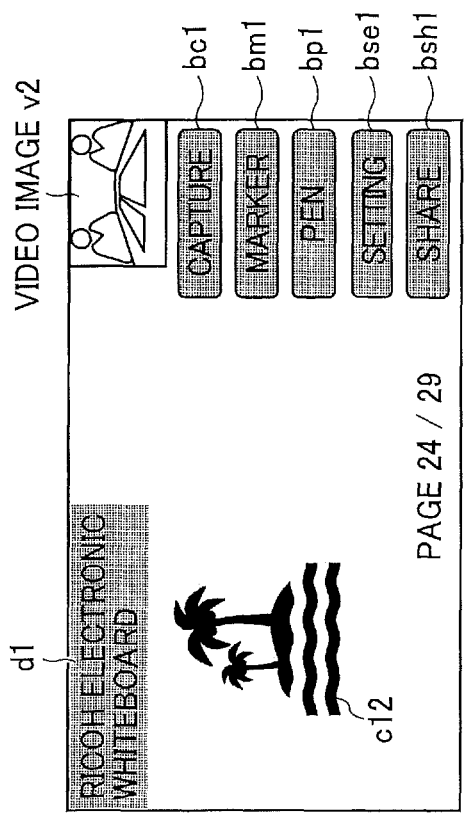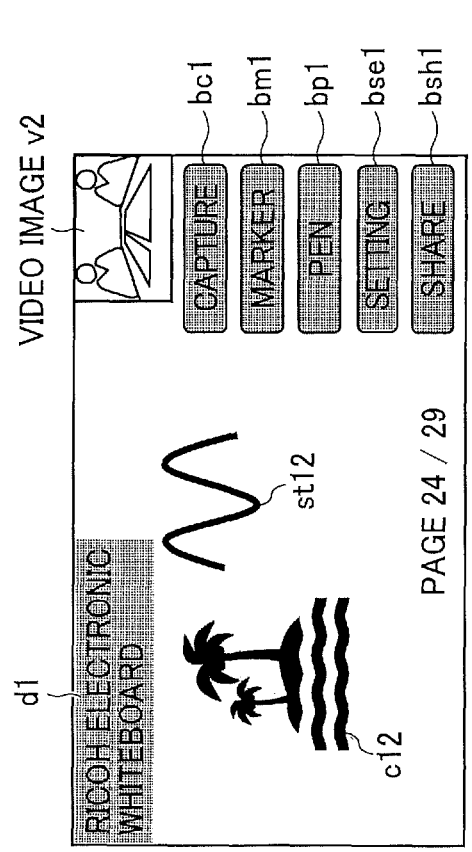

COMMUNICATION TERMINAL SHARING IMAGE DATA WITH COUNTERPART COMMUNICATION TERMINAL, SYSTEM INCLUDING THE SAME, AND METHOD FOR CONTROLLING IMAGE CAPTURE

CROSS-REFERENCE TO RELATED APPLICATIONS

This patent application is based on and claims priority pursuant to 35 U.S.C. § 119(a) to Japanese Patent Application No. 2020-128601, filed on Jul. 29, 2020, in the Japan Patent Office, the entire disclosure of which is hereby incorporated by reference herein.

BACKGROUND

Technical Field

The present invention relates to a communication terminal, a system, a control method, and a recording medium.

Related Art

Communication systems are now in widespread use, which allow communication terminals at remote locations to communicate through a communication network such as the Internet. Examples of the communication system include a conference system that performs videoconference in companies, educational institutions, administrative institutions, etc. In the conference system, the communication terminals that share images, such as electronic whiteboards, are often used. The communication terminal displays an image on a display and allows a user to draw stroke images such as text, numbers, figures, or the like on the image. Specifically, the communication terminal electronically converts content drawn through a user operation of touching and moving an electronic pen or the user's hand on a surface of the display, to generate stroke data. The stroke image is rendered based on the stroke data. When the stroke image is drawn on one communication terminal, stroke data for reproducing the stroke image is transmitted to the other communication terminal through the communication network to be displayed at the other communication terminal.

In some cases, however, the stroke image may contain confidential information. In view of this, there is a technology that restricts a user who does not participate in a conference, from viewing an electronic file that is viewed by a user who participates in the conference. For example, the presentation material that should not be allowed to be viewed by a user who has not participated in the conference is selected on a file-by-file basis from among one or more presentation materials used in the conference. The result of selection is recorded as masking information in presentation material management information, which associates a conference ID and names of electronic files used in the conference. From among electronic files associated with the conference ID, only one or more electronic files to which no masking information is associated are displayed to the user who has not participated in the conference.

SUMMARY

Example embodiments include a communication terminal for communicating with a counterpart communication terminal, including: circuitry to display an image based on image data to be shared with the counterpart communication terminal; receive an instruction to prohibit capturing of a screen that includes the image based on the image data; and transmit to the counterpart communication terminal information related to the instruction to prohibit capturing of the screen.

Example embodiments include a system including: a first communication terminal to display a first screen including an image based on image data; and a second communication terminal to display a second screen including the image based on the image data that is shared by the first communication terminal. The first communication terminal includes first circuitry to: receive an instruction to prohibit capturing of a screen that includes the image based on the image data by the second communication terminal; and transmit to the second communication terminal information related to the instruction to prohibit capturing of the screen. The second communication terminal including second circuitry to disable capturing of the screen that includes the image based on the image data, based on the information related to the instruction to prohibit capturing of the screen.

Example embodiments include a method for controlling capturing of an image, including: displaying, on a display of a first communication terminal, an image based on image data to be shared with a second communication terminal; at the first communication terminal, receiving an instruction to prohibit capturing of a screen that includes the image based on the image data; and transmitting, from the first communication terminal to the second communication terminal, information related to the instruction to prohibit capturing of the screen, to control screen capturing by the second communication terminal.

Example embodiments include a non-transitory recording medium storing a control program for causing one or more processors to perform a method for controlling capturing of an image.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3A is a diagram illustrating an example of a layer structure of each image on a screen, displayed at the electronic whiteboard;

FIG. 3B is a diagram illustrating an example of a layer structure of each image on a screen, displayed at the electronic whiteboard, when the screen is being captured;

FIG. 8B is a schematic diagram illustrating an example operation information stored in an operation information management database, according to the embodiment;

FIG. 9A is a conceptual diagram illustrating an example confidential information management table;

FIG. 9B is a conceptual diagram illustrating an example confidential information management table;

FIG. 10A is a conceptual diagram illustrating an example authentication management table;

FIG. 10B is a conceptual diagram illustrating an example terminal management table;

FIG. 11A is a conceptual diagram illustrating an example of a destination list management table;

FIG. 11B is a conceptual diagram illustrating an example session management table;

FIG. 11C is a conceptual diagram illustrating an example relay device management table;

FIG. 21A is an example screen of the source electronic whiteboard;

FIG. 21B is an example security setting screen of the source electronic whiteboard;

FIG. 21C is an example screen when all screens are set confidential, displayed at the source electronic whiteboard;

FIG. 21D is an example screen of the destination electronic whiteboard when all screens are set confidential;

FIG. 23A is an example screen of the source electronic whiteboard;

FIG. 23B is an example security setting screen of the source electronic whiteboard;

FIG. 23C is an example screen when none of screens is set confidential, displayed at the source electronic whiteboard; and FIG. 23D is an example screen of the destination electronic whiteboard when none of screens is set confidential.

Figure 1:
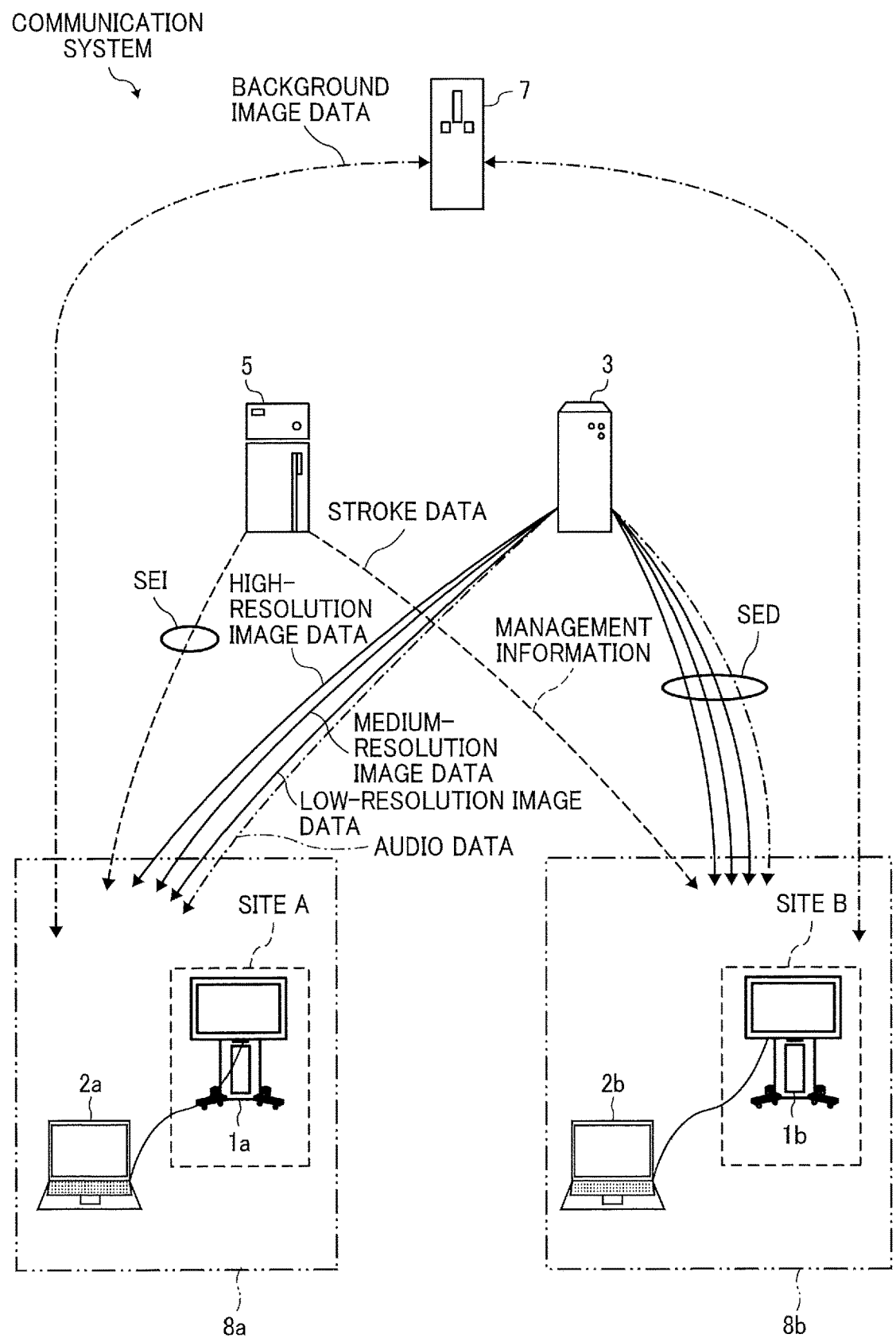
FIG. 1 is a diagram illustrating an example of a communication route in the communication system according to an embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise. In the description of the drawings, the same elements are denoted by the same reference numerals, and redundant description is omitted.

Overview of Communication System

Communication Route

Referring to FIG. 1, a communication system for conducting a video conference between a plurality of electronic whiteboards including an electronic whiteboard 1a and an electronic whiteboard 1b while allowing a user to draw images on the electronic whiteboard is described according to an embodiment. FIG. 1 is a diagram illustrating an example of a communication route in the communication system according to the embodiment. The "videoconference" is sometimes called a "teleconference". In this disclosure, a videoconference is described as an example, and other examples may be a meeting or a simple conversation.

The communication system includes a plurality of electronic whiteboard including the electronic whiteboards 1a and the electronic whiteboard 1b, a relay device 3, a communication management system 5, and an image storage device 7. The electronic whiteboard 1a and the electronic whiteboard 1b perform mutual communication of image data and audio data for calls and content data such as image data and stroke data for sharing. The stroke data is data used for reproducing a stroke image. The stroke data includes coordinate data, line width data, line color data, vector data, and the like. The electronic whiteboard 1a and the electronic whiteboard 1b exchange video data and audio data for a call with each other, to reproduce video and sound of the communication counterpart, thereby making a remote video call.

The electronic whiteboard 1a and the electronic whiteboard 1b exchange image data of a document image to be shared, allowing participants using the communication system to share the same document image. The document image is an image displayed on the display of the electronic whiteboard 1a or 1b. Examples of the document image include, but not limited to, an image of a document that is shared during a conference. In this disclosure, the "document image" may include a video as a moving image, but is simply referred to as a "document image" for simplicity. That is, the data indicating the document image includes the document image data and the document video data.

Further, the electronic whiteboard 1a and the electronic whiteboard 1b exchange stroke data of a stroke image, allowing participants using the communication system to share the same stroke image. The stroke image is an image drawn by a user with such as an electronic pen. Specifically, the stroke image is an image represented by a point or a line drawn by the user with a handwritten stroke. The stroke image is displayed based on stroke data representing a point on a coordinate of the display at the electronic whiteboard 1a or 1b.

Although in the example of FIG. 1, the communication system includes the two electronic whiteboards, i.e., the electronic whiteboard 1a and the electronic whiteboard 1b, in another example, the communication system may include three or more electronic whiteboards. The electronic whiteboard 1a and the electronic whiteboard 1b are collectively referred to as an "electronic whiteboard 1" or "electronic whiteboards 1" hereinafter, to simplify the description, unless they need to be distinguished from one to another.

FIG. 1 illustrates an electronic whiteboard equipped with a videoconferencing function as an example of the electronic whiteboard 1a and the electronic whiteboard 1b. The image of the video data can be either a moving (video) image or a still image.

In this disclosure, an electronic whiteboard that sends a request for starting a videoconference is referred to as a "source terminal", and an electronic whiteboard as a request destination to which the request is to be transmitted is referred to as a "destination terminal". In FIG. 1, the electronic whiteboard 1a is the source terminal and the electronic whiteboard 1b is the destination terminal. When the start of the videoconference is requested from the electronic whiteboard 1b, the electronic whiteboard 1b is the source terminal and the electronic whiteboard 1a is the destination terminal. Note that the electronic whiteboard 1a and the electronic whiteboard 1b may be used not only for communication between different offices or for communication between different rooms in the same office, but also for communication within the same room or for outdoor-indoor communication or outdoor-outdoor communication.

Personal computers 2a and 2b (collectively referred to as the PC 2) are computers connected to the electronic whiteboards 1a and 1b, respectively. The PC 2a and PC 2b transmit video (image) to be output as a document image, and audio, to the electronic whiteboards 1a and 1b, respectively. The PC 2 and the electronic whiteboards 1a and 1b are connected to each other by an interface cable such as VGA (registered trademark) or HDMI (registered trademark). In the present embodiment, the PC 2 functions as an example of an information processing apparatus.

The relay device 3, which is implemented by one or more computers, performs a process of relaying content data for a call (or communication) between the electronic whiteboard 1a and the electronic whiteboard 1b.

The communication management system 5 is configured by one or more computers, and collectively manages login authentication from the electronic whiteboards 1a and 1b, management of the communication status of the electronic whiteboards 1a and 1b, management of the destination list, the communication status of the relay device 3, and the like. Further, the communication management system 5 relays stroke data to be shared between the electronic whiteboard 1a and the electronic whiteboard 1b.

The image storage device 7, which is implemented by one or more computers, stores image data of a document image to be shared, which is uploaded from the electronic whiteboard 1a and is downloaded to the electronic whiteboard 1b. The reverse is also performed. That is, the image storage device 7 stores image data of a document image to be shared, which is uploaded from the electronic whiteboard 1b and is downloaded to the electronic whiteboard 1a.

In one example, each of the relay device 3, the communication management system 5, and the image storage device 7 is configured as a single computer. In another example, each of the relay device 3, the communication management system 5, and the image storage device 7 is configured as a plurality of computers to which one or more units (functions, means, or storages) are arbitrarily allocated. In other words, each of the relay device 3, the communication management system 5, and the image storage device 7 can be implemented by a plurality of servers that operate in cooperation with one another.

In the communication system of FIG. 1, a management information session sei for exchanging various types of management information is established between the electronic whiteboard 1a and the electronic whiteboard 1b through the communication management system 5. In addition, four sessions are established between the electronic whiteboard 1a and the electronic whiteboard 1b to exchange four types of data including image data of high resolution, image data of medium resolution, image data of low resolution, and audio data, through the relay device 3. In FIG. 1, these four sessions are collectively referred to as an image and audio data session sed. The image and audio data session sed does not necessarily have the four sessions. The number of sessions included in the image and audio data session sed may be a smaller or larger number of sessions than the four. In addition, a communication session may be established directly between the source terminal and the destination terminal without intervening the relay device 3.

Further, in the communication system of FIG. 1, stroke data is exchanged between the electronic whiteboard 1a and the electronic whiteboard 1b using the management information session sei.

The description is now given of the resolution of video data to be processed in the present embodiment. For example, the low-resolution video data has, for example, 120 pixels in the horizontal direction and 160 pixels in the vertical direction. The low-resolution video data serves as a base image. The medium-resolution video data has 240 pixels in the horizontal direction and 320 pixels in the vertical direction. The high-resolution video data has, for example, 480 pixels in the horizontal direction and 640 pixels in the vertical direction. In a case where passing through a narrow band path, low-quality video data that only includes the low-resolution video data serving as the base image is relayed. In the case of a relatively wide band path, medium-quality image data including the low-resolution video data serving as the base image and the medium-resolution video data is relayed. In the case of a very wide band path, high-quality video data including the low-resolution video data serving as the base image, the middle-quality video data, and the high-quality video data is relayed. Since the audio data has a smaller data size than the video data, audio data is relayed even on the narrow band path.

Use Scenario of Electronic Whiteboard

Figure 2:
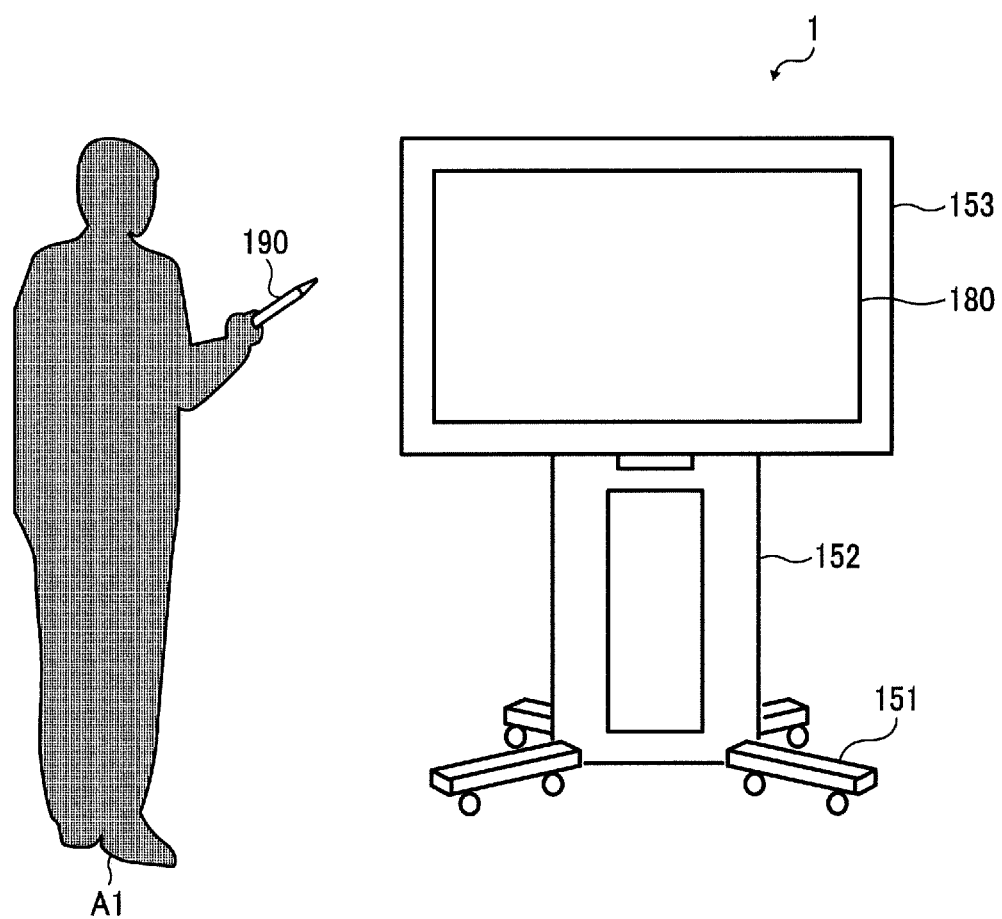
FIG. 2 is a diagram illustrating an example application of an electronic whiteboard according to the embodiment.

FIG. 2 is a diagram illustrating an example application of an electronic whiteboard according to an exemplary embodiment. As illustrated in FIG. 2, the electronic whiteboard 1 includes a plurality of legs 151 each having a caster on the lower side, a support 152 provided on the upper side of the legs 151, a main body 153 provided on top of the support 152, and a display 180 provided on the front surface of the main body 153. The main body 153 includes a central processing unit (CPU) 101 and the like which is described below. The user (such as the user A1) can input (draw) a stroke image such as characters on the display 180 using an electronic pen 190 or the like.

Layer Structure of Image Displayed on Electronic Whiteboard

FIGS. 3A and 3B are diagrams illustrating a layer structure of an image displayed on the electronic whiteboard according to the embodiment. FIG. 3A is a diagram illustrating an example of a layer structure of each image on a screen of PC ("PC screen"), displayed on the electronic whiteboard. FIG. 3B is a diagram illustrating an example of a layer structure of each image on a screen that is captured ("capture screen"), displayed on the electronic whiteboard. In this example, the PC screen is a screen displayed on the display 180 of the electronic whiteboard 1, based on an image or video transmitted from the PC 2 connected to the electronic whiteboard 1, and is also referred to as a first screen. The capture screen is a screen displayed on the PC 2, which has been captured in response to a screen capture operation by the user, and is also referred to as a second screen. For the descriptive purposes, in the present embodiment, an image or video (moving image) transmitted from the PC 2 is collectively referred to as an "image".

As illustrated in FIG. 3A, the electronic whiteboard 1 generates an image in which four image layers are superimposed (combined) one above the other. Specifically, a UI image (L1), a shared stroke image (L2), a document image (L3), and a background image (L4), from the left to the right in FIG. 3A, are superimposed in this order, such that the user can view content in each image layer even if the image layers overlap with one another. Of these layers, the layer of the UI image (L1) and the layer of the background image (L4) are image layers displayed only on the electronic whiteboard 1a. The layer of the shared stroke image (L2) and the layer of the document image (L3) are image layers that are shared with the other electronic whiteboard 1b for display. In addition to these image layers, video of a counterpart party at the other site is displayed using the picture-in-picture technique. Each image layer will be described below. In this description, the layer represents a structure or state in which images are superimposed one above the other, like cell images. In the present embodiment, it is assumed that, of the above-described layers, the layer of the shared stroke (L2), the layer of the document image (L3), and the layer of the background image (L4) are captured, in response to screen capture operation at the electronic whiteboard 1a or the electronic whiteboard 1b. However, the present invention is not limited to this example, and any layer may be captured in response to screen capture operation, for example, depending on a model of the electronic whiteboard. Further, not all of the image layers described above may be displayed. For example, the layer of the background image does not have to be displayed.

The layer of the UI image (L1) is an image layer that displays such as a button or an icon, and receives a UI (User Interface) operation such as input or selection, to allow the user to input or select with the electronic pen 190 or the hand H. FIGS. 3A and 3B display the example case in which a "share" icon a11 for receiving operation such as pressing (hereinafter, simply referred to as "operation") to select a share mode, and a "non-share" icon a12 for receiving operation to select a non-share mode. The UI screen (L1) may also display buttons or icons for setting such as the color or width of a line drawn with the electronic pen 190.

The layer of the shared stroke image (L2) is an image layer, which includes a stroke image drawn by the user with the electronic pen 190 or the hand H, to be shared with the electronic whiteboard 1b at the other side (in case of the "shared mode"). In this case, the electronic whiteboard 1a transmits stroke data to the other electronic whiteboard 1b via the communication network 100, to cause the electronic whiteboard 1b at the other side to display the same stroke image displayed at the electronic whiteboard 1a. In this example, a stroke image b with a curved arrow is displayed.

The layer of the document image (L3) is an image layer for displaying the document image, which is an output image output from such as the PC 2 connected to the electronic whiteboard PC 2. In this example, a document image c1 with a pie chart is displayed. However, the document image may be displayed based on any image data stored in any desired memory, such as the image data stored in a local memory of the electronic whiteboard, a memory of a server or a portable recording medium accessible from the electronic whiteboard.

The layer of the background image (L4) is an image layer for displaying a background image specific to each electronic whiteboard 1. The background image is an image that is basically unchanged unlike the stroke image and the document image, and is an image used for improving appearance of the entire image displayed on the display 180. In this example, a background image d1, such as a grid image including preset characters, is displayed on the display 180.

Similarly, four image layers L1 to L4 are displayed on the electronic whiteboard 1b. Of these layers, the layer of the UI image (L1) and the layer of the background image (L4) are image layers displayed only on the electronic whiteboard 1b. The layer of the shared stroke image (L2) and the layer of the document image (L3) are image layers that are shared with the other electronic whiteboard 1a for display.

As illustrated in FIG. 3B, the electronic whiteboard 1b generates an image in which four image layers are superimposed (combined) one above the other. Specifically, the UI image (L1), the shared stroke image (L2), the document image (L3), and the background image (L4), from the left to the right in FIG. 3B, are superimposed in this order, such that the user can view content in each image layer even if the image layers overlap with one another. As a difference from FIG. 3A, FIG. 3B illustrates an example capture screen at the electronic whiteboard 1b, in which the document image c1 is not displayed in the layer of the document image L3 but displayed in the layer of the background image d1. Processing to generate the PC screen or the capture screen will be described in detail later.

Hardware Configuration

A description is given hereinafter of a hardware configuration of the communication system according to the embodiment.

Hardware Configuration of Electronic Whiteboard

Figure 4:
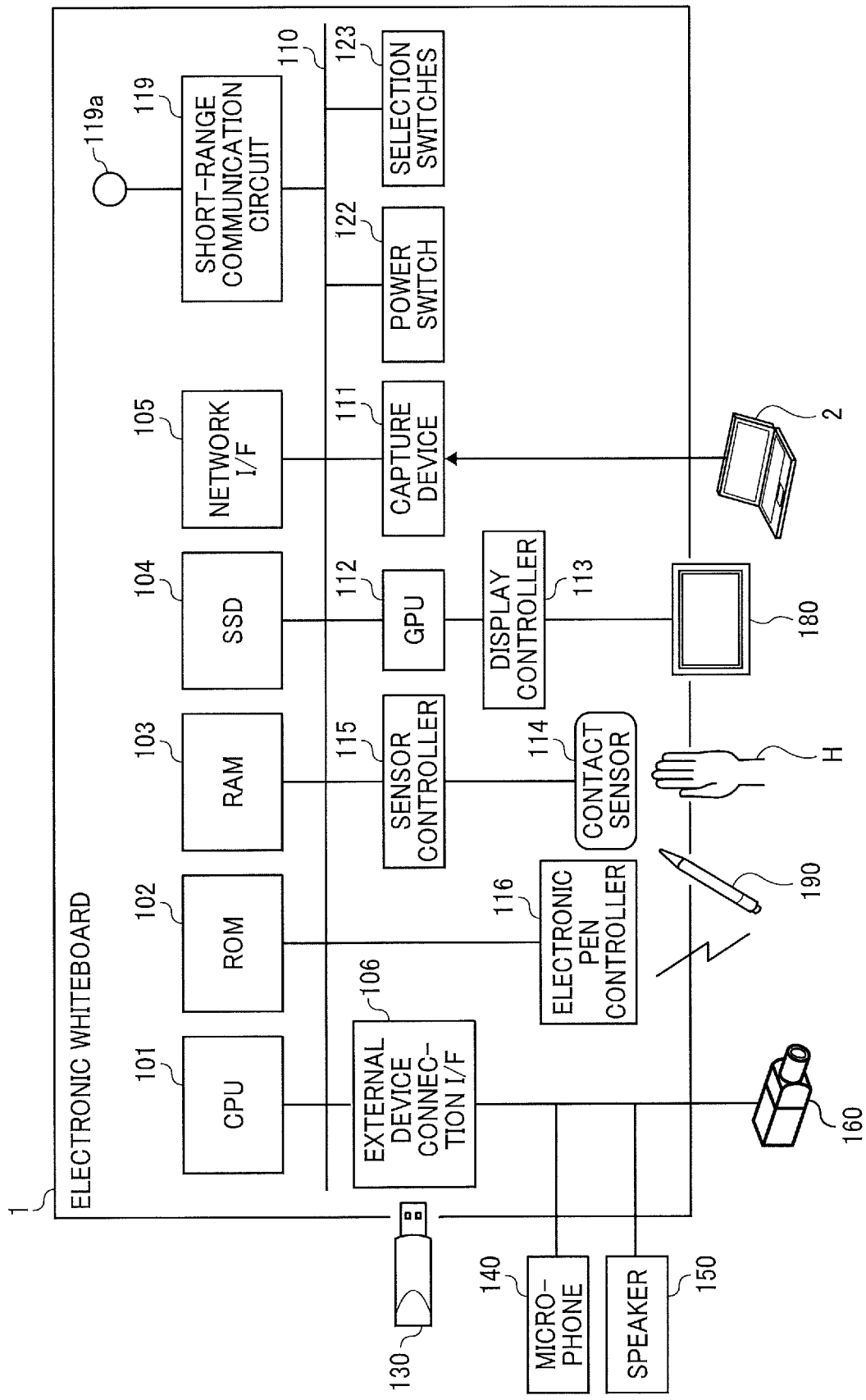
FIG. 4 is a block diagram illustrating an example hardware configuration of the electronic whiteboard according to the embodiment.

FIG. 4 is a block diagram illustrating an example hardware configuration of the electronic whiteboard according to the embodiment. As illustrated in FIG. 4, the electronic whiteboard 1 includes a central processing unit (CPU) 101, a read only memory (ROM) 102, a random access memory (RAM) 103, a solid state drive (SDD) 104, a network interface (I/F) 105, and an external device connection interface (I/F) 106.

The CPU 101 controls entire operation of the electronic whiteboard 1. The ROM 102 stores a control program for controlling the CPU 101 such as an initial program loader (IPL) to boot the CPU 101. The RAM 103 is used as a work area for the CPU 101. The SSD 104 stores various data such as a control program for the electronic whiteboard 1. The network I/F 105 controls communication with an external device through the communication network 100. The external device connection I/F 106 is an interface for connecting the electronic whiteboard 1 to various extraneous sources. Examples of the extraneous sources include a universal serial bus (USB) memory 130 and devices (a microphone 140, a speaker 150, and a camera 160).

The electronic whiteboard 1 further includes a capture device 111, a graphics processing unit (GPU) 112, a display controller 113, a contact sensor 114, a sensor controller 115, an electronic pen controller 116, a short-range communication circuit 119, an antenna 119a of the short-range communication circuit 119, a power switch 122, and selection switches 123.

The capture devices 111 is hardware that displays video information as a still image or a moving image on a display of the PC 2 connected to the electronic whiteboard 1. The capture device 111 is also referred to as a capture board, and is connected to the PC 2 via a USB I/F, for example. The GPU 112 is a semiconductor chip dedicated to graphics processing. The display controller 113 controls display of screens to output an image output from the GPU 112 to the display 180 or the like. The contact sensor 114 detects a touch onto the display 180 with the electronic pen 190 or a user's hand H. The sensor controller 115 controls operation of the contact sensor 114. The contact sensor 114 inputs and senses a coordinate by an infrared blocking system. More specifically, the display 180 is provided with two light receiving elements disposed on both upper side ends of the display 180, and a reflector frame surrounding the sides of the display 180. The light receiving elements emit a plurality of infrared rays in parallel to a surface of the display 180. The light receiving elements receive lights passing in the direction that is the same as an optical path of the emitted infrared rays, which are reflected by the reflector frame. The contact sensor 114 outputs an identifier (ID) of the infrared ray that is blocked by an object (such as the user's hand) after being emitted from the light receiving elements, to the sensor controller 115. Based on the ID of the infrared ray, the sensor controller 115 detects a particular coordinate that is touched by the object. The electronic pen controller 116 communicates with the electronic pen 190 to detect a touch by the tip or bottom of the electronic pen 190 to the display 180. The short-range communication circuit 119 is a communication circuit that communicates in compliance with the near field communication (NFC), the Bluetooth (Registered Trademark), and the like. The power switch 122 is a switch that turns on or off the power of the electronic whiteboard 1. The selection switches 123 are a group of switches for adjusting brightness, hue, etc., of display on the display 180, for example.

The electronic whiteboard 1 further includes a bus line 110. The bus line 110 is, for example, an address bus or a data bus, which electrically connects the elements, such as the CPU 101 illustrated in FIG. 4, each other.

The contact sensor 114 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition to or in alternative to detecting a touch by the tip or bottom of the electronic pen 190, the electronic pen controller 116 may also detect a touch by another part of the electronic pen 190, such as a part held by a hand of the user. As described above, in the present embodiment, the electronic whiteboard 1 (the electronic whiteboard 1a or the electronic whiteboard 1b) functions as an example of a communication terminal.

Figure 5:
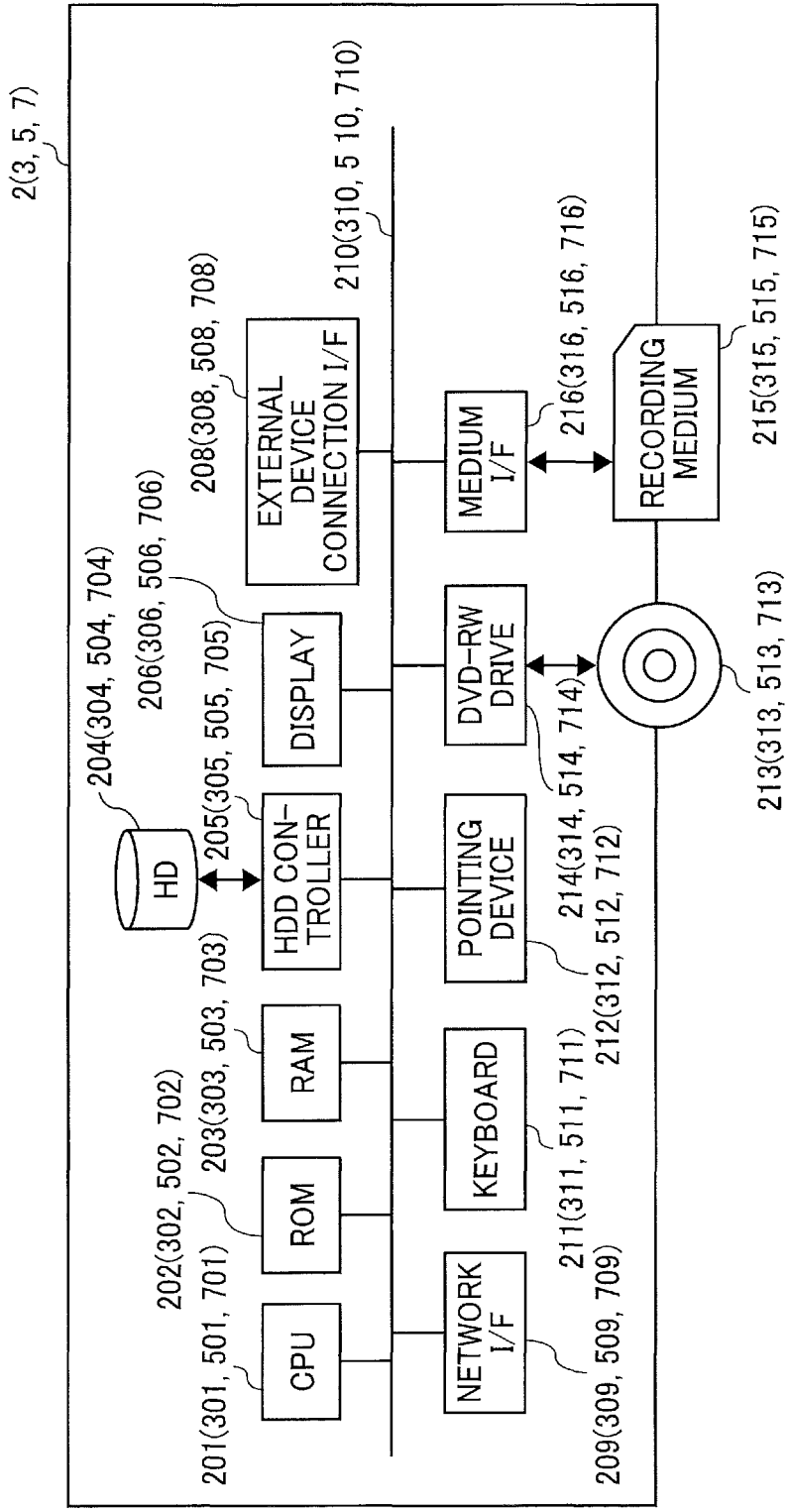
FIG. 5 is a block diagram illustrating an example of a hardware configuration of a PC, relay device, communication management system, and image storage device, in the communication system of FIG. 1, according to the embodiment.

Hardware Configuration of PC, Relay Device, Communication Management System, and Image Storage Device FIG. 5 is a block diagram illustrating an example of a hardware configuration of the PC, relay device, communication management system, and image storage device, according to the embodiment. The PC 2, implemented by one or more computers, includes a CPU 201, a ROM 202, a RAM 203, a HD 204, a HDD controller 205, a display 206, an external device connection I/F 208, a network I/F 209, a keyboard 211, a pointing device 212, a DVD-RW (Digital Versatile Disk ReWritable) drive 214, a medium I/F 216, and a bus line 210.

The CPU 201 controls entire operation of the PC 2. The ROM 202 stores a program such as an initial program loader (IPL) used for driving the CPU 201. The RAM 203 is used as a work area for the CPU 201. The HD 204 stores various data such as an information processing control program. The HDD controller 205 reads or writes various data from or to the HD 204 under control of the CPU 201. The display 206 displays various information such as a cursor, menu, window, characters, or image. The external device connection I/F 208 is an interface for connecting the electronic whiteboard 1 to various extraneous sources. The network I/F 209 is an interface for performing data communication using the communication network such as the Internet. The keyboard 211 is one example of an input device provided with a plurality of keys for allowing a user to input characters, numerals, or various instructions. The pointing device 212 is an example of an input device, such as a mouse, that allows a user to select or execute a specific instruction, select a target for processing, or move a cursor being displayed. The DVD-RW drive 214 controls reading or writing (storing) of data from or to a DVD-RW 213. Alternatively, the DVD-RW drive 214 may control the reading or writing (storing) of data from or to a disc such as a Blu-ray (registered trademark) Disc Rewritable (BD-RE) instead of the DVD-RW. The medium I/F 216 reads or writes (stores) data from or to a recording medium 215 such as a flash memory.

The bus line 210 is, for example, an address bus or a data bus that electrically connects the elements illustrated in FIG. 5, such as the CPU 201.

The hardware configurations of the relay device 3, the communication management system 5, and the image storage device 7 illustrated in FIG. 1 are the same or substantially the same as the hardware configuration of the PC 2, and redundant description thereof is omitted. The relay device 3, however, stores a relay control program in the HD 304. The communication management system 5 stores a communication control program in the HD 504. In addition, the image storage device 7 stores an image storage control program in the HD 704.

Overview of Configuration of Communication System

Figure 6:
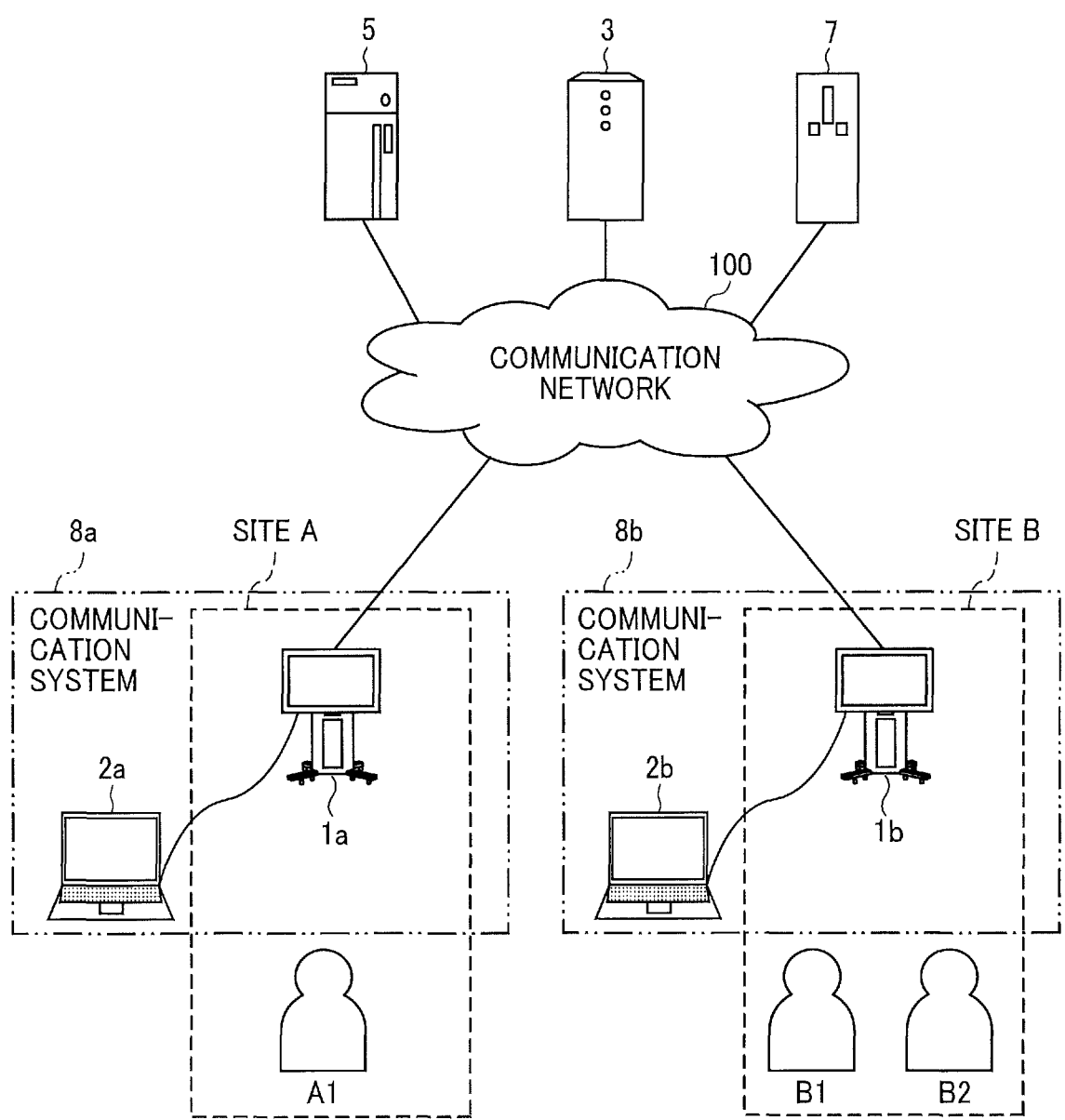
FIG. 6 is a diagram illustrating an example of a general arrangement of the communication system according to the embodiment.

A description is now given of an overall configuration of the communication system with reference to FIG. 6, according to an embodiment. FIG. 6 is a schematic diagram illustrating an overview of the communication system, according to an embodiment of the present disclosure.

In FIG. 6, the electronic whiteboard 1a is provided at a site A, and the electronic whiteboard 1b is provided at a site B. For example, the site A is a Tokyo office in Japan, and the site B is Osaka office in Japan. Further, a user A1 uses the electronic whiteboard 1a at the site A, and users B1 and B2 use the electronic whiteboard 1b at the site B.

The electronic whiteboard 1a, the electronic whiteboard 1b, the relay device 3, the communication management system 5, and the image storage device 7 mutually communicate data through the communication network 100 such as the Internet. The communication network 100 may include a wireless network, in addition to a wired network. The function of the image storage device 7 can be substituted by the relay device 3.

Referring to FIGS. 1 and 6, the electronic whiteboard 1a is an electronic whiteboard capable of communicating video data with the PC 2a. A system including the electronic whiteboard 1a and the PC 2a is referred to as an information communication system 8a. In FIGS. 1 and 6 described above, the PC 2a is provided outside the site A, but the PC 2a may be provided within the site A where the electronic whiteboard 1a is provided. The electronic whiteboard 1b is an electronic whiteboard capable of communicating video data with the PC 2b. A system including the electronic whiteboard 1b and the PC 2b is referred to as an information communication system 8b. Similarly to the above-described case of PC 2a, in FIGS. 1 and 6, the PC 2b is provided outside the site B, but may be provided at the site B where the electronic whiteboard 1b is provided. The information communication system 8a and the information communication system 8b may be collectively referred to as an information communication system 8.

Functional Configuration of Communication System

Figure 7A:
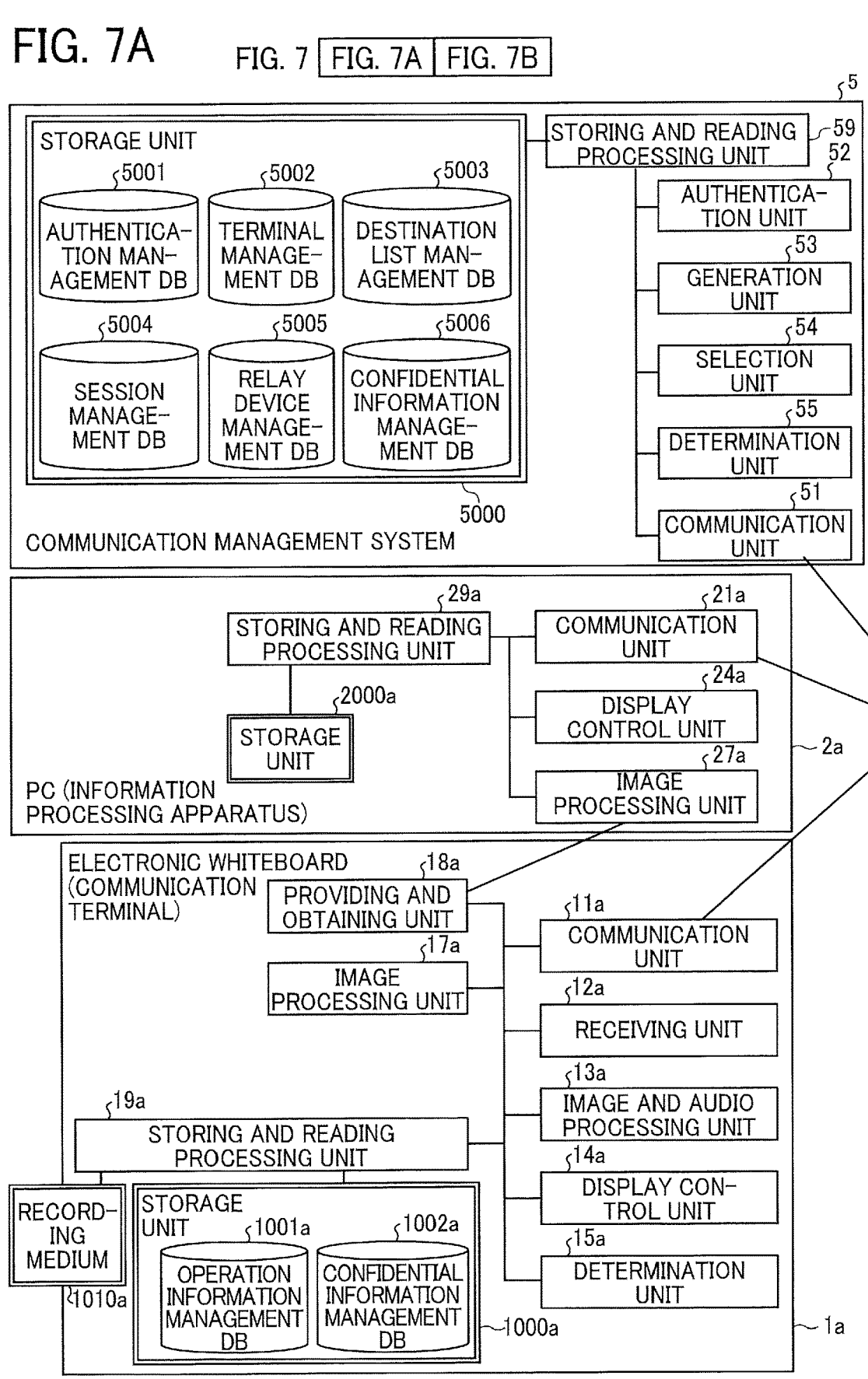
FIGS. 7A and 7B are a block diagram illustrating an example functional configuration of the communication system according to embodiment.
Figure 7B:
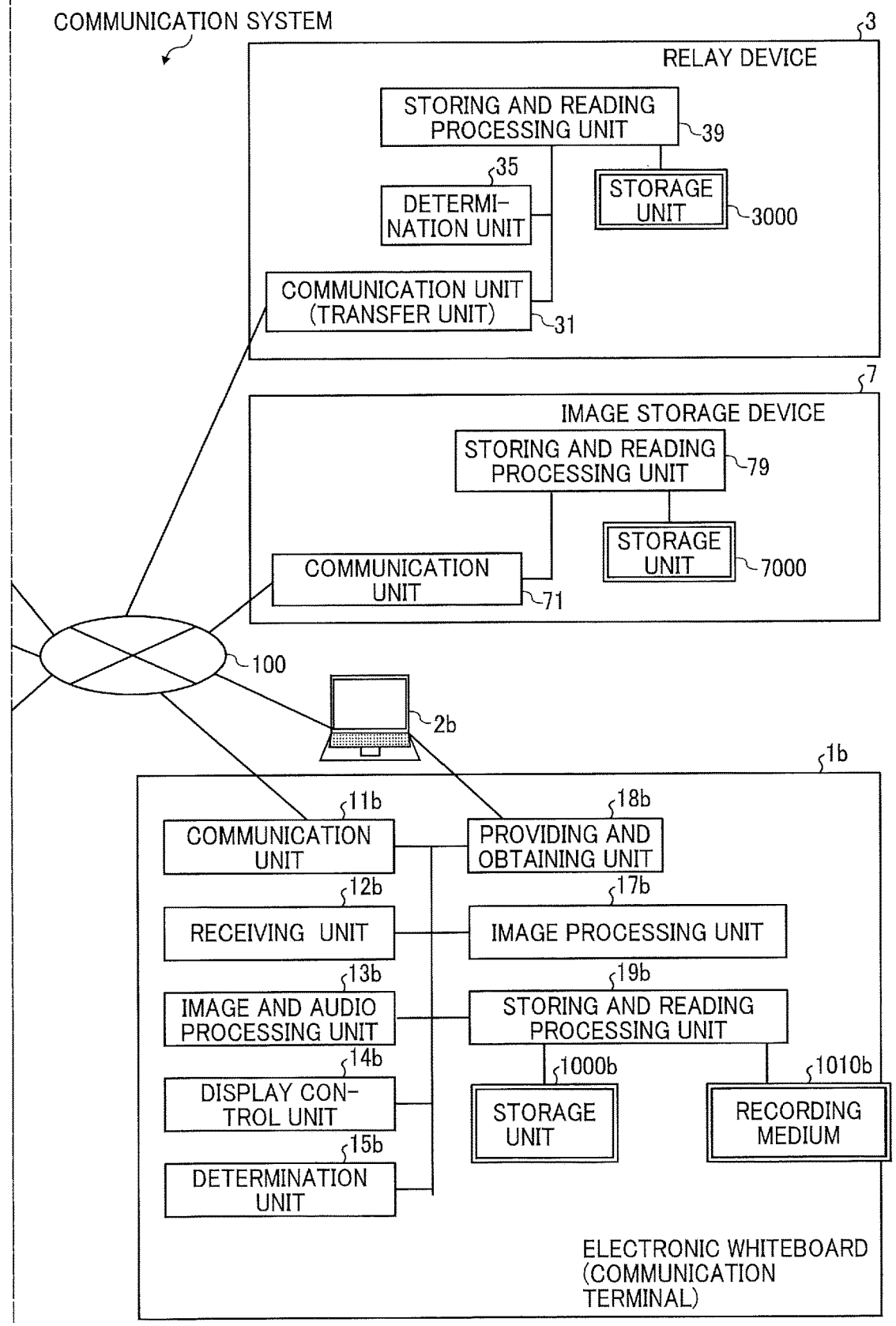

A description is given below of functional configuration of the communication system illustrated in FIG. 1 according to the present embodiment, with reference to FIG. 7A to FIG. 11. FIGS. 7A and 7B are a block diagram illustrating an example functional configuration of the communication system according to embodiment.

Functional Configuration of Electronic Whiteboard 1a

As illustrated in FIG. 7A, the electronic whiteboard 1a includes a communication unit 11a, a receiving unit 12a, an image and audio processing unit 13a, a display control unit 14a, a determination unit 15a, an image processing unit 17a, a providing and obtaining unit 18a, and a storing and reading processing unit 19a. These units are functions implemented by or caused to function by operating any of the hardware elements illustrated in FIG. 4 in cooperation with the instructions of the CPU 101 according to the control program expanded from the SSD 104 to the RAM 103. The electronic whiteboard 1a further includes a storage unit 1000a, which is implemented by the RAM 103 and SSD 104 illustrated in FIG. 4.

Concept of Drawing Screen Information

Figure 8A:
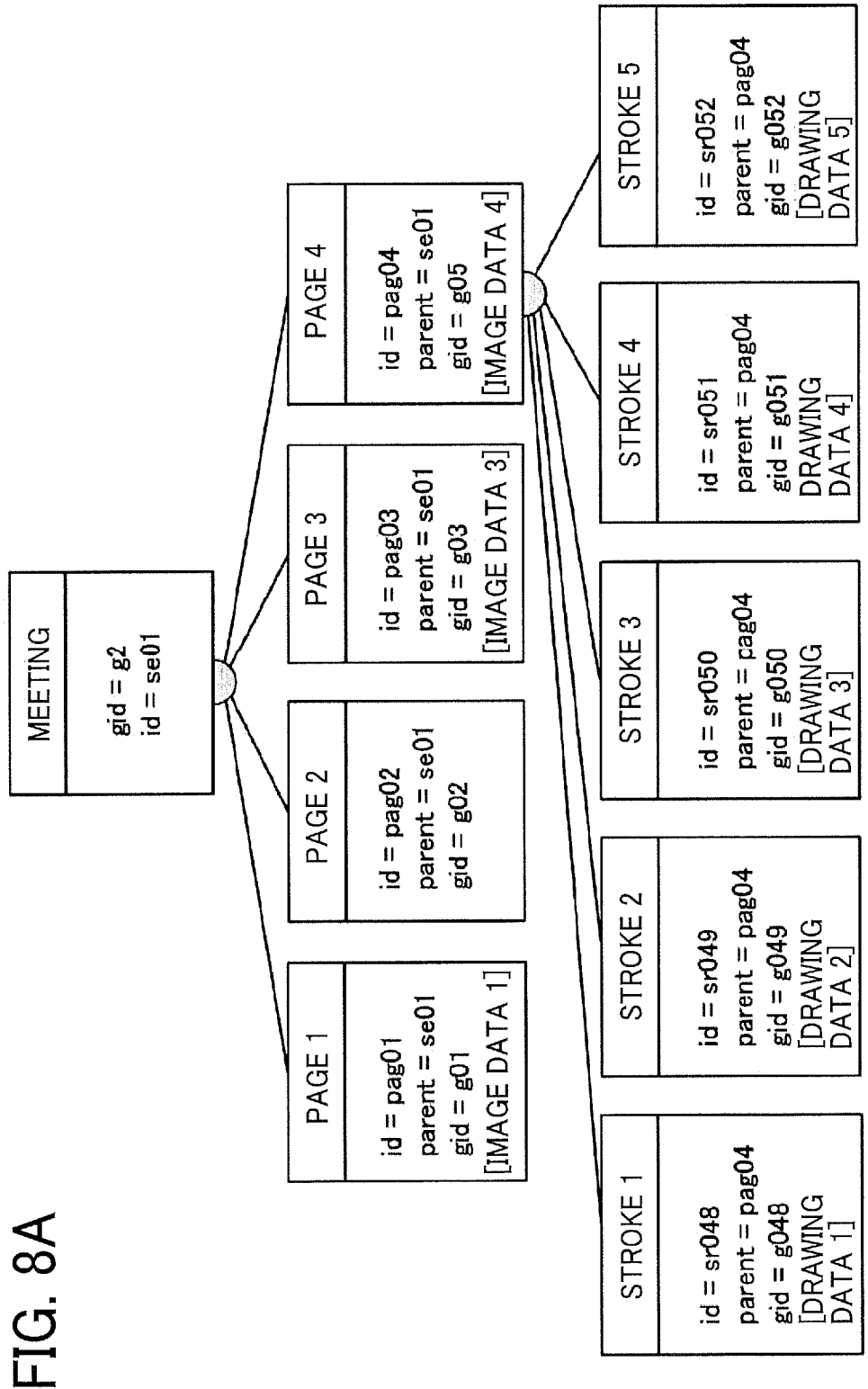
FIG. 8A is a schematic diagram illustrating an example of drawing screen information according to the embodiment.

FIG. 8A is a schematic diagram illustrating an example of drawing screen information according to the embodiment. FIG. 8A illustrates an example image of a drawing screen displayed on the electronic whiteboard 1, based on information stored in the drawing screen management DB 2001.

In the example of FIG. 8A, the drawing screen has a hierarchical structure of "meeting", "pages (pages 1 to 4)", and "strokes (strokes 1 to 5)". The "stroke" corresponds to stroke data in this embodiment, and is managed for each "page". The "page" represents a one-page screen (display screen) displayed on the display 180. The "meeting" represents information on a meeting (conference) being conducted using the electronic whiteboard 1. For example, the stroke 1 includes a stroke ID (id=sr048) for identifying the stroke 1, information (parent=pag04) for identifying a page 1 as a parent (root), gid "g048" for identifying drawing data 1, and drawing data 1, etc. For example, when operation such as movement is performed on the stroke image represented by the stroke 1, the stroke ID (id=sr048) is inherited as it is, but the gid "g048" for identifying the drawing data 1 and the drawing data 1 are each updated. The drawing data 1 is drawing data for reproducing the stroke 1. The drawing data 1 includes, for example, coordinate data, line width data, line color data, and vector data.

The electronic whiteboard 1 can switch from one page to other page, and the "page" corresponds to each page of screens displayed at the electronic whiteboard 1. For example, the page 1 includes a page ID (id=pag01) for identifying page 1, information (parent=se01) for identifying a "meeting" as a parent (root), and gid "g01" for identifying a page (page data), and image data 1, etc. The image data 1 is image data of a background image constituting the page 1. That is, the image data 1 represents the background image displayed on the page 1. In this example, the page 2 does not include image data. This means that the page 2 has no background image (or a blank background).

The "meeting" corresponds to a session managed by the communication system 1, and is managed using, for example, a session ID (id=se01) for identifying each session. For example, the image processing unit 17a of the electronic whiteboard 1 can generate the stroke image drawn on the page 1 by using the drawing data 1 to 5 included in the strokes 1 to 5.

This concept of a tree diagram of the drawing screen information described above can be applied to disable screen capturing (for example, controlled by security setting) for any particular event such as a meeting, a particular page, or a particular stroke image.

Operation Information

Referring to FIG. 8B, operation information indicating operation on a drawing screen at the electronic whiteboard 1, is described according to the embodiment. FIG. 8B is a conceptual diagram illustrating an example of an operation information management table. The storage unit 1000 includes an operation information management DB 1001a that stores the operation information as illustrated in FIG. 8B.

The operation information illustrated in FIG. 8B stores information regarding operations performed on the drawing screen displayed at the electronic whiteboard 1. The operation information illustrated in FIG. 8B includes a stroke ID (Id) for identifying stroke data of a stroke, a page ID (DistId) for identifying a page on which a stroke is drawn, operation type information (Operation Type) indicating a type of operation on the drawing screen, data type information (Data Type) indicating a type of data to be operated, and data specific information (Date) regarding the content of the data to be operated.

Of these items, the operation type information indicates a type of operation performed by a user on the stroke or page included in the drawing screen. For example, when the operation target is a stroke, the operation type information indicates "Add" when the stroke is drawn, "Remove" when the stroke is deleted, and "Update" when the stroke is moved. Further, the data type information indicates "Stroke" when the operation target is a stroke, and "Page" when the operation target is a page. Further, when the operation target is a stroke, the data specific information represents the stroke data, and includes information such as coordinate data, line width data, and line color data.

In this example, the data to be operated is not limited to one stroke or one page, but may be an object as a collection of a plurality of strokes. Such object includes texts obtained by applying OCR (Optical Character Reader) processing to strokes representing symbols such as characters or numbers, system generated characters such as date or time, certain figures such as triangles, stars or circles, or lines such as arrows, line segments, or Bezier curves.

Confidential Information Management Table

FIG. 9A is a conceptual diagram illustrating an example of a confidential information management table. The storage unit 1000 stores a confidential information management database (DB) 1002a that includes the confidential information management table as illustrated in FIG. 9A. The confidential information management table stores, for each meeting (conference), a meeting ID, a document ID, a confidentiality range, and a page number of a page to be confidential (confidential page number), in association with each other. Of these data items, the meeting ID is identification information for identifying a meeting (conference) as an example of an event managed by the communication system. Although the meeting ID is used in the present embodiment, the event is not limited to the meeting as long as the event managed by the communication system. For example, the event may be a networking event, a presentation, a training, or the like held between the sites where the electronic whiteboards are provided. In the present embodiment, the document ID indicates a control number of the document displayed on the electronic whiteboard 1, and specifically, is given as an example of identification information for identifying image data in the document. Further, the confidential information management table as illustrated in FIG. 9A may not include the meeting ID, such that the confidentiality range and the confidential page number are stored in association with each other for each document ID. Examples of the document include a text image, an image, and a moving image (video) with audio.

The confidentiality range indicates whether the document is to be confidential, or which part of the document is to be confidential, and is set at the electronic whiteboard 1a, which is an example of the source terminal that starts communication to share the image. The confidentiality range is an example of the confidentiality type. In this example, "confidentiality" or "be confidential" means to disable capturing of a screen displayed at the electronic whiteboard 1b, when the image displayed on the electronic whiteboard 1a is displayed on the electronic whiteboard 1a. For example, when "all" is set as the confidentiality range, capturing of the entire document having a particular document ID, which is displayed at the electronic whiteboard 1a and shared with the electronic whiteboard 1b, is prohibited (disabled) at the electronic whiteboard 1b. In another example, when "partial" is set, capturing of only a designated part of the document having a particular document ID, displayed at the electronic whiteboard 1a and shared with electronic whiteboard 1b is prohibited (disabled) at the electronic whiteboard 1b. Further, when "none" is set, capturing of the entire document having a particular document ID, displayed at the electronic whiteboard 1a and shared with the electronic whiteboard 1b is allowed (enabled) at the electronic whiteboard 1b.

The confidential page number is page identification information for identifying a page from which the capturing is prohibited (disabled), from among the pages of the document having a particular document ID that is displayed at the electronic whiteboard 1b. Instead of the confidential page number, a confidential slide number, which is a number assigned to each slide in the document, may be used. In the present embodiment, the confidential information management table (confidential information management DB 1002a) functions as an example of confidential information management unit.

Functional Configuration of Electronic Whiteboard as Source Terminal

A description is now given of the functional units of the electronic whiteboard 1a according to the embodiment. The communication unit 11a, which is implemented by instructions of the CPU 101 and by the network I/F 105 illustrated in FIG. 4, transmits or receives various types of data (or information) to or from other terminal, device, apparatus, or system through the communication network 100. Further, the communication unit 11a also serves as a starting unit and executes a process for starting communication with another communication terminal such as the electronic whiteboard 1b. The receiving unit 12, which is implemented by instructions of the CPU 101, by the electronic pen controller 116, by the contact sensor 114, and by the sensor controller 115 illustrated in FIG. 4, receives various inputs from the user, which is input with such as the electronic pen 190 or a part of a body of the user such as the hand. The receiving unit 12a also has a function of receiving operation via each selection button (icon) described later. In the present embodiment, the electronic pen 190 is an example of a predetermined instrument. As the predetermined instrument, any instrument other than the electronic pen 190 may be used as long as the instrument includes an interface communicable with the electronic pen controller 116 illustrated in FIG. 4.

The image and audio processing unit 13a is implemented by instructions from the CPU 101, microphone 140, speaker 150, and camera 160 illustrated in FIG. 4, and performs processing to conduct video conference. For example, the image and audio processing unit 13 performs digital processing such as encoding of image (video) data and audio data in accordance with the output signal of the microphone 140 and the output signal of the camera 160. The image and audio processing unit 13a generates a video signal or an audio signal based on the image (video) data and audio data received by the communication unit 11a. Further, the image and audio processing unit 13 performs processing for combining image (video) data having different resolutions.

The display control unit 14a is implemented by instructions of the CPU 101 and by the display controller 113 illustrated in FIG. 4, and controls output of an image (video) signal to the display 180, for example. In the present embodiment, the display control unit 14a (display control unit 14b) functions as an example of a first display control unit (second display control unit). Further, the display 180 functions as an example of a first display unit (second display unit).

The determination unit 15a is implemented by instructions of the CPU 101 illustrated in FIG. 4, and performs various determinations.

The image processing unit 17a is implemented by instructions of the CPU 101 illustrated in FIG. 4, and performs processing to control functions of the electronic whiteboard. For example, the image processing unit 17a generates stroke data and a stroke image based on a stroke of the electronic pen 190 or the like, received at the receiving unit 12a. Alternatively, the image processing unit 17a generates a stroke image based on stroke data received by the communication unit 11a. The image processing unit 17a generates an image signal representing the document image based on image data of a document image received by the communication unit 11a. The image processing unit 17a (image processing unit 17b) acquires (captures) a screen in response to a request for capturing a screen by the user (screen capturing). That is, the image processing unit 17a (image processing unit 17b) functions as an example of a capturing unit in the present embodiment. Further, the image processing unit 17a performs processing, such as image processing performed by the electronic whiteboard. For example, the image processing unit 17a performs superimposition (combining) of image layers as described above referring to FIGS. 3A and 3B.

The providing and obtaining unit 18a is implemented by instructions of the CPU 101, the external device connection I/F 106, and the short-range communication circuit 119 illustrated in FIG. 4. The providing and obtaining unit 18a acquires image data representing the document image (video image) from each device or terminal having an interface such as the external device connection I/F or short-range communication circuit. The providing and obtaining unit 18a is communicable with the providing and obtaining unit 28a of the PC 2a.

The storing and reading processing unit 19a is implemented by instructions of the CPU 101, external device connection I/F 106, ROM 102, and SSD 104, illustrated in FIG. 4, and stores various types of data in the storage unit 1000a or the recording medium 1010a such as the USB memory 130 or reads various types of data from the storage unit 1000a or the recording medium 1010a.

Further, every time image (video) data and audio data are received in performing communication with other terminal, the storing and reading processing unit 19a overwrites the image data and audio data stored in the storage unit 1000a. The display 180 displays an image based on image data before being overwritten. The speaker 150 outputs sound based on audio data before being overwritten.

Functional Configuration of Electronic Whiteboard as Destination Terminal

As illustrated in FIG. 7B, the electronic whiteboard 1b includes a communication unit 11b, a receiving unit 12b, an image and audio processing unit 13b, a display control unit 14b, a determination unit 15b, an image processing unit 17b, a providing and obtaining unit 18b, and a storing and reading processing unit 19b. The electronic whiteboard 2 further includes a storage unit 1000b, which is implemented by the RAM 103 and SSD 104 illustrated in FIG. 4. The communication unit 11b, the receiving unit 12b, the image and audio processing unit 13b, the display control unit 14b, the determination unit 15b, the image processing unit 17b, the providing and obtaining unit 18b, and the storing and reading processing unit 19b are similar in function to the communication unit 11a, the receiving unit 12a, the image and audio processing unit 13a, the display control unit 14a, the determination unit 15a, the image processing unit 17a, the providing and obtaining unit 18b, and the storing and reading processing unit 19a, respectively, and thus description thereof will be omitted. Similarly, since the storage unit 1000b has the same function as that of the storage unit 1000a, description thereof will be omitted.

Functional Configuration of PC

As illustrated in FIG. 7A, the PC 2a includes a communication unit 21a, a display control unit 24a, an image processing unit 27a, and a storing and reading processing unit 29a. These units are functions that are implemented by or means that are caused to function by operating any of the hardware elements illustrated in FIG. 5 in cooperation with the instructions of the CPU 201 according to the information processing program expanded from the HD 204 to the RAM 203. The PC 2a further includes a storage unit 2000a implemented by RAM 203 and HD 204 illustrated in FIG. 5.

Each Functional Unit of PC

A detailed description is now given of the functional units of the PC 2a. The communication unit 21a of the PC 2a illustrated in FIG. 7A, which is implemented by instructions of the CPU 201, external device connection I/F 208, and network I/F 209 illustrated in FIG. 5, transmits or receives various types of data (or information) to or from other terminal, device, apparatus, or system through the communication network 100. The display control unit 24a is implemented by instructions of the CPU 201 and by the display 206 illustrated in FIG. 5, and controls output of an image (video) signal to the display 206, for example. The image processing unit 27a is implemented by instructions of the CPU 201 illustrated in FIG. 5, and performs processing to convert the image data or the video data, generated by the PC 2a, to the image or the video. The storing and reading processing unit 29a, which is implemented by instructions of the CPU 201, ROM 202, HDD controller 205, and HD 204, illustrated in FIG. 5, stores various data in the storage unit 2000 or reads various data from the storage unit 2000. Since the PC 2b that communicates with the electronic whiteboard 1b also has the same functions as those of the PC 2a, description thereof is omitted.

Functional Configuration of Relay Device

As illustrated in FIG. 7B, the relay device 3 includes a communication unit 31, which also functions as a transfer unit, a determination unit 35, and a storing and reading processing unit 39. Each of the above-mentioned units is a function that is implemented by or that is caused to function by operating any of the elements illustrated in FIG. 5 according to an instruction from the CPU 301 according to a relay device control program expanded from the HD 304 to the RAM 303. The relay device 3 further includes a storage unit 3000 implemented by the RAM 303 and HD 304 illustrated in FIG. 5.

Functional Unit of Relay Device

A description is now given of each of the functional units of the relay device 3 in detail. The communication unit 31 of the relay device 3 illustrated in FIG. 7B, which is implemented by instructions of the CPU 301, external device connection I/F 308, and network I/F 309 illustrated in FIG. 5, transmits or receives various types of data (or information) to or from other terminal, device, apparatus, or system through the communication network 100. The communication unit 31 also functions as a transfer unit, and transfers image (video) data and audio data transmitted from one terminal to another terminal. The determination unit 35 performs various determinations such as determination of whether data transmission is delayed.

The storing ad reading processing unit 39, which is implemented by instructions of the CPU 301, ROM 302, HDD controller 305, and HD 304, illustrated in FIG. 5, stores various data in the storage unit 3000 or reads various data from the storage unit 3000.

Functional Configuration of Communication Management System

As illustrated in FIG. 7A, the communication management system 5 includes a communication unit 51, an authentication unit 52, a generation unit 53, a selection unit 54, a determination unit 55, and a storing and reading processing unit 59. Each of the above-mentioned units is a function that is implemented by or that is caused to function by operating any of the elements illustrated in FIG. 5 according to an instruction from the CPU 501 according to a communication management program expanded from the HD 504 to the RAM 503. The communication management system 5 further includes a storage unit 5000 implemented by RAM 503 and HD 504 illustrated in FIG. 5.

Authentication Management Table

FIG. 10A is a conceptual diagram illustrating an example authentication management table. The storage unit 5000 stores an authentication management database (DB) 5001, which is implemented by the authentication management table as illustrated in FIG. 10A. The authentication management table stores, for each one of the electronic whiteboards 1 managed by the communication management system 5, a terminal ID of the electronic whiteboard and a password in association with each other. For example, the authentication management table illustrated in FIG. 10A indicates that the terminal ID of the electronic whiteboard 1a (communication terminal) is "01aa" and the password of the electronic whiteboard 1a is "aaaa" The password is an example of authentication information. The authentication information also includes an access token. In the present embodiment, the authentication management table (authentication management DB 5001) functions as an example of an authentication management unit.

Terminal Management Table

FIG. 10B is a conceptual diagram illustrating an example terminal management table. The storage unit 5000 stores a terminal management DB 5002, which is implemented by the terminal management table as illustrated in FIG. 10B. The terminal management table stores, for each one of the terminal IDs identifying the electronic whiteboards 1 (communication terminals), a terminal name to be used when each electronic whiteboard 1 is a destination terminal, an operation state of each electronic whiteboard 1, reception date and time when login request described below is received by the communication management system 5, and the internet protocol (IP) address of each electronic whiteboard 1 (communication terminal) in association with each other. For example, the terminal management table illustrated in FIG. 10B indicates that the electronic whiteboard 1a whose terminal ID is "01aa" has the terminal name "TERMINAL AA, TOKYO BRANCH, JAPAN" and the operation state of the electronic whiteboard 1a is "Online (Communication available)". Further, the terminal management table indicates that the date and time when the login request is received by the communication management system 5 is "13:40 on Jun. 19, 2020" and the IP address of the electronic whiteboard 1a is "1.2.1.3". The terminal ID, the terminal name, and the IP address of the electronic whiteboard, as the communication terminal, are stored when each electronic whiteboard 1 is pre-registered to receive service provided by the communication management system 5. In the present embodiment, the terminal management table (terminal management DB 5002) functions as an example of a terminal management unit.

Destination List Management Table

FIG. 11A is a conceptual diagram illustrating an example of a destination list management table. The storage unit 5000 stores a destination list management DB 5003, which is implemented by the destination list management table as illustrated in FIG. 11A. The destination list management table stores the terminal ID of the source terminal (electronic whiteboard 1) that sends a request for a start of communication in association with the terminal IDs of all destination terminals (electronic whiteboards 1) registered as destination terminal candidates for the source terminal. For example, the destination list management table illustrated in FIG. 11A indicates that the destination terminal candidates to which the source terminal (electronic whiteboard 1a) whose terminal ID is "01aa" can send the request for the start of communication are the electronic whiteboard 1b whose terminal ID is "01ba", etc. The destination terminal candidates are updated by addition or deletion in response to an addition or deletion request transmitted from any source terminal to the communication management system 5.

The destination list is an example of destination information. In another example, the destination information can be managed in various ways other than the list format as illustrated in FIG. 11A, as long as information on destination such as a terminal ID can be obtained. In the present embodiment, the destination list management table (destination list management DB 5003) functions as an example of a destination list management unit.

Session Management Table

FIG. 11B is a conceptual diagram illustrating an example session management table. The storage unit 5000 stores a session management DB 5004, which is implemented by the session management table as illustrated in FIG. 11B. The session management table stores, for each session ID for identifying a session to perform mutual communication between each electronic whiteboard 1 (communication terminal) and the relay device 3, a relay device ID of the relay device 3 to be used, a source terminal ID of the electronic whiteboard 1 (source terminal), a destination terminal ID of electronic whiteboard 1 (destination terminal), a delay time (ms) in receiving image data at the destination terminal, and reception date and time when delay information indicating this delay time is transmitted from the destination terminal and received by the communication management system 5, in association. For example, the session management table illustrated in FIG. 11B indicates that, in a communication session identified with the session ID "se01", the relay device with the relay device ID "111a" relayed image data and audio data between the electronic whiteboard with the terminal ID "01aa" and the electronic whiteboard with the terminal ID "01db", the delay time of the image data received by the electronic whiteboard (destination terminal) at "13:41 on Jun. 19, 2020" was 200 ms. In the present embodiment, the session management table (session management DB 5004) functions as an example of a session management unit.

Relay Device Management Table

FIG. 11C is a conceptual diagram illustrating an example relay device management table. The storage unit 5000 stores a relay device management DB 5005, which is implemented by the relay device management table as illustrated in FIG. 11C. The relay device management table stores, for each one of the relay devices 3, the relay device ID, the operation state of the relay device 3, the date and time when the communication management system 5 received state information indicating the operation state, an IP address of the relay device 3, and maximum data transmission speed (Mbps) of the relay device 3, in association. For example, the relay device management table illustrated in FIG. 11C indicates that the relay device 3 whose relay device ID is "111a" has the operation state "Online", the date and time when the communication management system 5 received the state information is "13:00 on Apr. 10, 2019", the IP address of the relay device 3 is "1.2.1.2", and the maximum data transmission speed of the relay device 3 is 100 Mbps. In the present embodiment, the relay device management table (relay device management DB 5005) functions as an example of a relay device management unit.

Confidential Information Management Table

FIG. 9B is a conceptual diagram illustrating an example confidential information management table. The storage unit 5000 stores a confidential information management database (DB) 5006 that includes the confidential information management table as illustrated in FIG. 9B. The confidential information management table stores, for each meeting (conference), a meeting ID, a document ID, a confidentiality range, and a page number of a page to be confidential, in association with each other.

Since the meeting ID, the document ID, the confidentiality range, and the confidential page number are the same as those of the confidential information management table in the confidential information management DB 1002a described above, detailed description thereof will be omitted.

Functional Units of Communication Management System

A detailed description is now given of each of the functional units of the communication management system 5. The communication unit 51 of the communication management system 5 illustrated in FIG. 7A, which is implemented by instructions of the CPU 501, external device connection I/F 508, and network I/F 509 illustrated in FIG. 5, transmits or receives various types of data (or information) to or from other terminal, device, apparatus, or system through the communication network 100.

The authentication unit 52, which is implemented by instructions of the CPU 501 illustrated in FIG. 5, searches the authentication management DB 5001 stored in the storage unit 5000 using the terminal ID and password included in a login request received via the communication unit 51 as search keys, to perform authentication by determining whether the same pair of a terminal ID and a password are stored in the authentication management DB 5001. The generation unit 53, which is implemented by the instructions of the CPU 501 illustrated in FIG. 5, generates a session ID for identifying a communication session based on a communication start request from the electronic whiteboard 1 (described below as step S62). The selection unit 54, which is implemented by the instructions of the CPU 501 illustrated in FIG. 5, performs processing to select one relay device 3 from the plurality of relay devices 3. The determination unit 55 is mainly implemented by instructions of the CPU 501 illustrated in FIG. 5, and makes various determinations in the communication management system 5. The storing ad reading processing unit 59, which is implemented by instructions of the CPU 501, ROM 502, HDD controller 505, and HD 504, illustrated in FIG. 5, stores various data in the storage unit 5000 or reads various data from the storage unit 5000.

Functional Configuration of Image Storage Device

As illustrated in FIG. 7B, the image storage device 7 includes a communication unit 71 and a storing and reading processing unit 79. These units are functions that are implemented by or that are caused to function by operating any of the elements illustrated in FIG. 5 in cooperation with instructions of the CPU 701 according to the image storage device control program expanded from the HD 704 to the RAM 703. The image storage device 7 further includes a storage unit 7000 implemented by the RAM 703 and the HD 704, illustrated in FIG. 5.

Functional Units of Image Storage Device

A description is now given of the functional units of the image storage device 7 in detail. The communication unit 71 of the image storage device 7 illustrated in FIG. 7B, which is implemented by instructions of the CPU 701, external device connection I/F 708, and network I/F 709 illustrated in FIG. 5, transmits or receives various types of data (or information) to or from other terminal, device, apparatus, or system through the communication network 100. The storing ad reading processing unit 79, which is implemented by instructions of the CPU 701, ROM 702, HDD controller 705, and HD 704, illustrated in FIG. 5, stores various data in the storage unit 7000 or reads various data from the storage unit 7000.

Processes and Operations

First Embodiment

Referring to FIGS. 12 to 23, processes and operations performed by the communication system is described according to the first embodiment.

Operation of Preparing for Remote Communication

Figure 12:
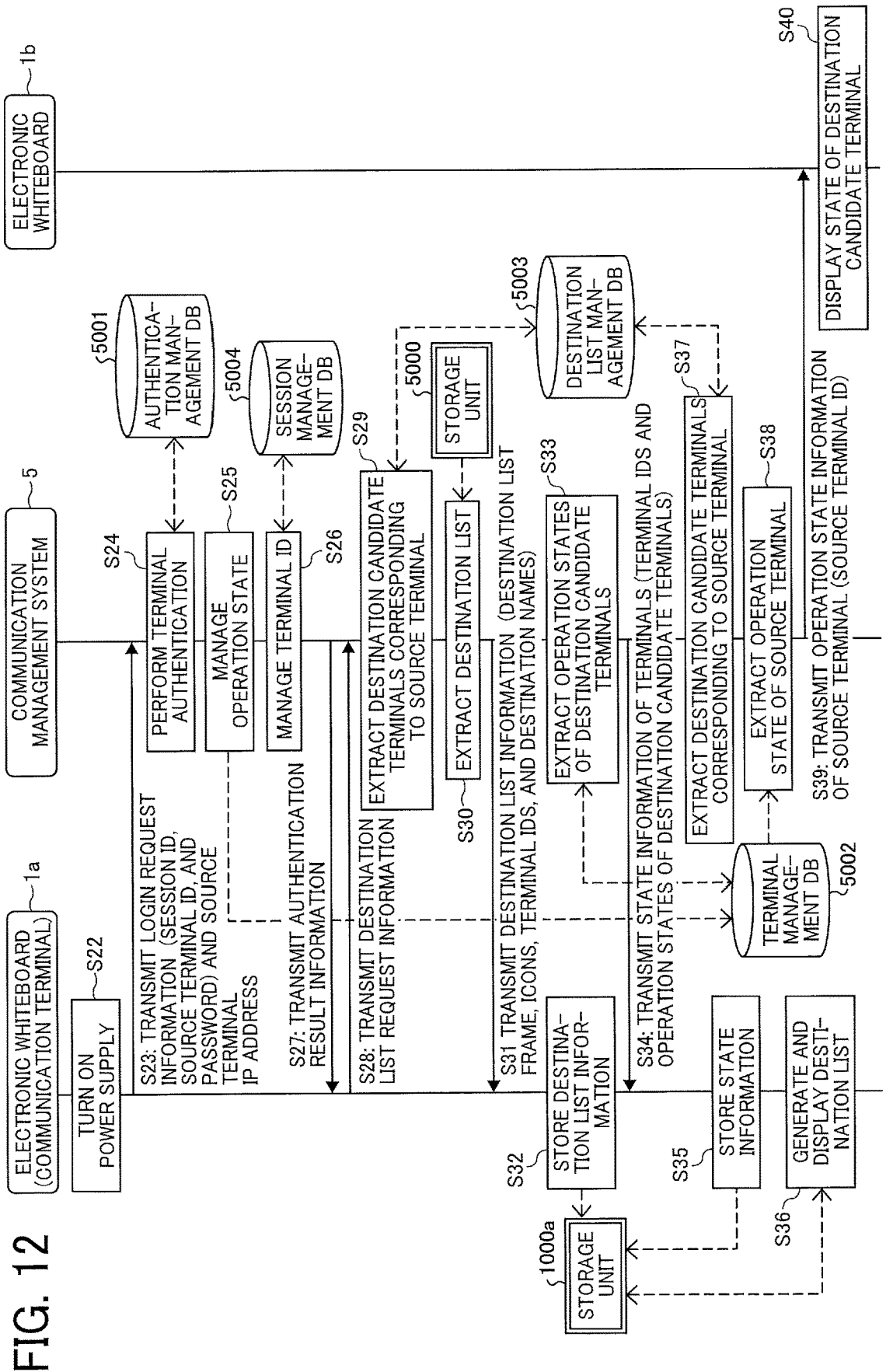
FIG. 12 is a sequence diagram illustrating operation for preparing to start remote communication between electronic whiteboards, performed by the communication system, according to an embodiment.
Figure 13:
FIG. 13 is a diagram illustrating an example of a destination list displayed on the electronic whiteboard.

First, a description is given of operation of preparing for remote communication, performed by the electronic whiteboard 1a as a communication terminal that sends a login request (referred to as the source terminal), with reference to FIG. 12 and FIG. 13. FIG. 12 is a sequence diagram illustrating operation for preparing to start remote communication between the electronic whiteboards. FIG. 13 is a diagram illustrating an example of a destination list displayed on the electronic whiteboard 1a. The electronic whiteboard 1b performs login operation in the same or substantially the same manner as the electronic whiteboard 1a, and thus the redundant description thereof is omitted below.

As the power switch 122 of the electronic whiteboard 1a is turned on, at S22, the receiving unit 12a receives a request to turn on the power of the electronic whiteboard 1a.

At S23, the communication unit 11a transmits login request information indicating a request for login authentication to the communication management system 5 through the communication network 100. Thereby, the communication unit 51 of the communication management system 5 receives the login request information transmitted from the communication unit 11a of the electronic whiteboard 1a. This login request information includes the terminal ID of the electronic whiteboard 1a and the password.

At S24, the authentication unit 52 of the communication management system 5 searches the authentication management table (FIG. 8) using the terminal ID and the password included in the login request information received via the communication unit 51 as search keys, to authenticate the communication terminal (electronic whiteboard 1) by determining whether the same terminal ID and the same password are stored in the authentication management table. The following description is provided assuming that the storing and reading processing unit 59 determines that the same terminal ID and the same password are stored in the authentication management table.

When the same terminal ID and the same password are stored in the authentication management table, the authentication unit 52 determines that the login request is received from the communication terminal (electronic whiteboard) that has a usage authorization. Accordingly, at S25, the storing and reading processing unit 59 of the communication management system 5 updates the operation state associated with the terminal ID received at S23 in the terminal management table (FIG. 10B) "Online (Communication Available)". Further, the storing and reading processing unit 59 stores the reception date and time when the login request information is received at S23 in the reception date and time field in the terminal management table. As a result, in the terminal management table, the terminal ID "01aa", the operation state "Online (Communication Available)", the reception date and time "2020.6.19.13:40", and the IP address "1.2.1.3" are stored in association with each other. Here, the IP address of the communication terminal (electronic whiteboard) may not be the IP address that is previously registered, but may be the IP address that is transmitted from the electronic whiteboard 1a at S23.

At S26, the storing and reading processing unit 59 adds a new record including the terminal ID of the electronic whiteboard 1a received at S23 in the session management table as illustrated in FIG. 11B.

At S27, the communication unit 51 of the communication management system 5 transmits the authentication result obtained at S24 to the electronic whiteboard 1a that has sent the login request through the communication network 100. Accordingly, the communication unit 11a of the electronic whiteboard 1a receives the authentication result information transmitted from the communication unit 51 of the communication management system 5.

At S28, when the communication unit 11a of the source terminal (electronic whiteboard 1a) receives the authentication result indicating that the communication terminal (electronic whiteboard 1a) has a usage authorization, the communication unit 11a transmits destination list request information indicating a request for a destination list to the communication management system 5 through the communication network 100. Accordingly, the communication unit 51 of the communication management system 5 receives the destination list request information transmitted from the communication unit 11a of the electronic whiteboard 1a.

At S29, the storing and reading processing unit 59 searches the destination list management table (FIG. 11A) using the terminal ID "01aa" of the source terminal (electronic whiteboard 1a) as a search key, to read the terminal IDs of the destination terminal candidates that can communicate with the source terminal (electronic whiteboard 1a). Further, the storing and reading processing unit 59 reads the destination names associated with the terminal IDs from the terminal management table (FIG. 10B). As a result, the terminal ID and terminal name of each of the destination terminal candidates corresponding to the terminal ID "01aa" of the source terminal (electronic whiteboard 1a) are extracted.

At S30, the communication unit 51 of the communication management system 5 reads destination list frame data and icon data indicating the operation state from the storage unit 5000 via the storing and reading processing unit 59. At S31, the communication unit 51 of the communication management system 5 transmits destination list information including the destination list frame, the icon, the terminal IDs, and the terminal names that are read by the storing and reading processing unit 59 to the source terminal (electronic whiteboard 1a).

Accordingly, the communication unit 11a of the source terminal (electronic whiteboard 1a) receives the destination list information transmitted from the communication unit 51 of the communication management system 5. At S32, the storing and reading processing unit 19a stores the destination list information in the storage unit 1000a.

In the embodiment, the communication management system 5 thus centrally manages the destination list information of all electronic whiteboards 1, instead of each of the electronic whiteboards 1 managing the destination list information. In the communication system of the embodiment, therefore, the communication management system 5 centrally responds to changes such as the addition of a new electronic whiteboard 1 to the communication system, the replacement of any of the electronic whiteboards 1 in the communication system with a new electronic whiteboard 1, and a change in the appearance of the destination list frame. Consequently, the electronic whiteboards 1 are saved from a process of changing the destination list information.

At S33, the storing and reading processing unit 59 of the communication management system 5 searches the terminal management table (FIG. 10B) using the read-out terminal IDs of the destination terminal candidates as search keys, to read the operation states associated with the terminal IDs, thereby acquiring the operation state of each of the electronic whiteboards 1 as the destination terminal candidates.

At S34, the communication unit 51 transmits terminal state information including the terminal IDs that are used as the search keys at S33 and the operation states of the corresponding destination terminals through the communication network 100 to the source terminal (electronic whiteboard 1a). Accordingly, the communication unit 11a of the electronic whiteboard 1a receives the terminal state information transmitted from the communication unit 51 of the communication management system 5.

At S35, the storing and reading processing unit 19a of the source terminal (electronic whiteboard 1a) successively stores the terminal state information of the terminals received from the communication management system 5 in the storage unit 1000a. As a result, the source terminal (electronic whiteboard 1a) acquires the operation state of the destination terminal candidate (electronic whiteboard 1b) that can communicate with the source terminal (electronic whiteboard 1a).

At S36, the display control unit 14a of the source terminal (electronic whiteboard 1a) generates a destination list reflecting the operation states of the destination terminal candidates based on the destination list information and the terminal state information stored in the storage unit 1000a. Further, the display control unit 14a controls the display 180 of the electronic whiteboard 1a to display a destination list screen 1100 as illustrated in FIG. 13. On the destination list screen 1100, the icon indicating the operation state, the terminal ID, and the terminal name are displayed for each destination terminal candidate. In the example of FIG. 13, the icons representing the operation states of the communication terminals displayed from the top of the screen indicate the operation states "Offline", "Online (Communication Available)", and "Online (Communication Available)".

At S37, the storing and reading processing unit 59 of the communication management system 5 searches the destination list management table (FIG. 11A) based on the terminal ID "01aa" of the source terminal (electronic whiteboard 1a), to extract the terminal IDs of other communication terminals that have registered the terminal ID "01aa" of source terminal (electronic whiteboard 1a) as the destination terminal candidate. In the destination list management table illustrated in FIG. 11A, the terminal IDs of other terminals to be read at S26 are "01ab", "01ba", "01bb", etc.

At S38, the storing and reading processing unit 59 of the communication management system 5 searches the terminal management table (FIG. 10B) based on the terminal ID "01aa" of the source terminal (electronic whiteboard 1a), to acquire the operation state of the source terminal (electronic whiteboard 1a).

At S39, the communication unit 51 transmits the terminal state information including the terminal ID "01aa" of the source terminal (electronic whiteboard 1a) and the terminal state information including the operation state "Online" acquired at S38, to the communication terminal(s) whose operation state is "Online" in the terminal management table (FIG. 10B) among the communication terminals identified by the terminal IDs extracted at S37. When the communication unit 51 transmits the terminal state information to the electronic whiteboard 1b, the IP address of the electronic whiteboard stored in the terminal management table (FIG. 10B) is referred to based on each terminal ID.

Thus, the terminal ID "01aa" and the operation state "Online" of the source terminal (electronic whiteboard 1a) are transmitted to each of the other destination terminals that can communicate with the login request sender terminal (electronic whiteboard 1a) as a destination terminal candidate. Accordingly, at S40, the operation state of the other destination terminal candidate is displayed on the destination terminal candidate (such as the electronic whiteboard 1b).

Operation of Starting Remote Communication

Figure 14:
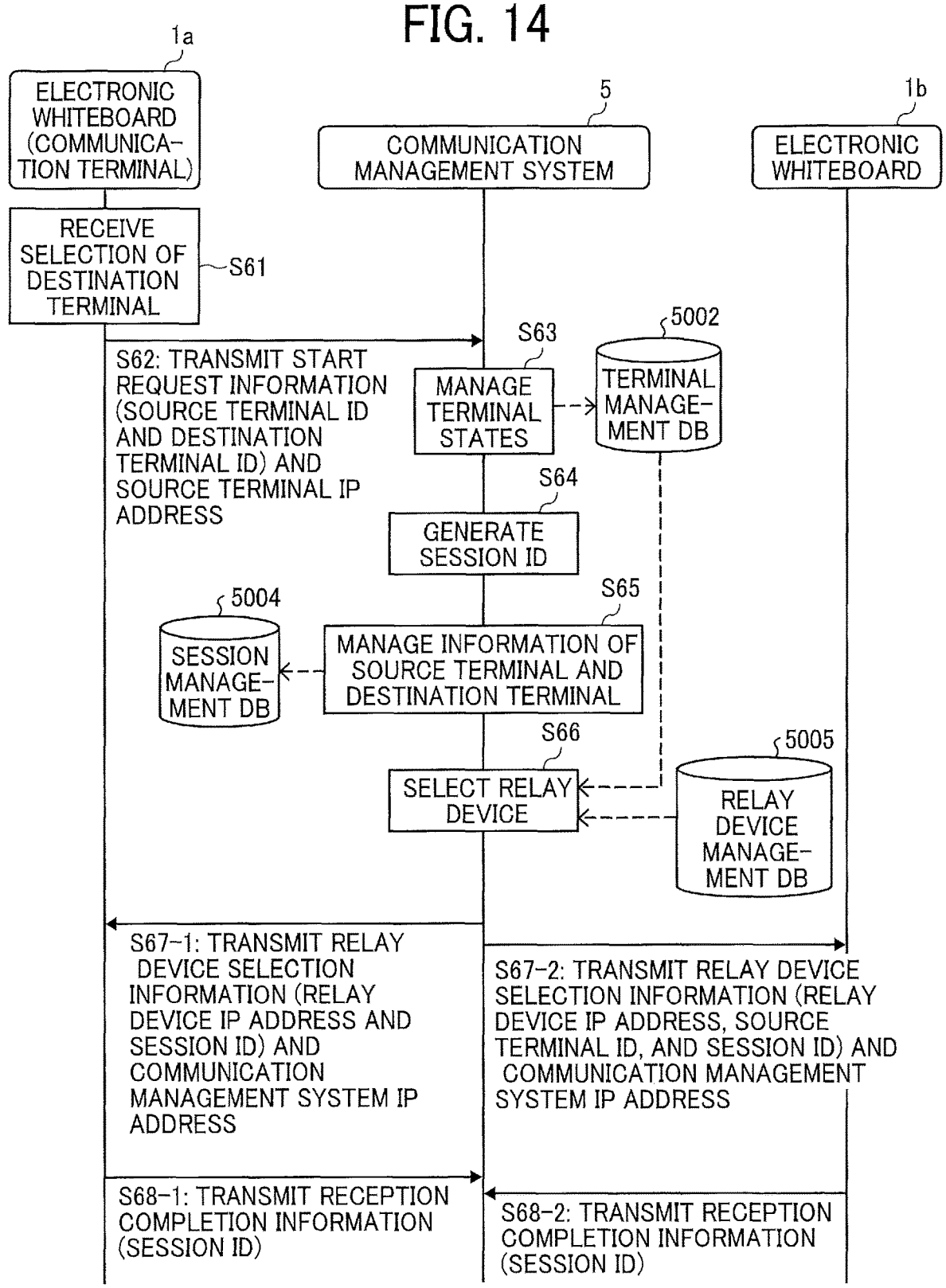
FIG. 14 is a sequence diagram illustrating an example operation of starting communication between the electronic whiteboards, performed by the communication system.

A description is now given of operation in which the electronic whiteboard 1a starts remote communication with the electronic whiteboard 1b, with reference to FIG. 14. FIG. 14 is a sequence diagram illustrating an example operation of starting communication.

At S61, when the user of a source terminal (electronic whiteboard 1a) selects the electronic whiteboard 1b by selecting a destination terminal candidate (terminal ID "01ba") illustrated in FIG. 10B, the receiving unit 12a illustrated in FIG. 7A receives a request to start communication with the selected destination terminal (electronic whiteboard 1b). At S62, the communication unit 11a of the source terminal (electronic whiteboard 1a) transmits start request information indicating a request for starting communication to the communication management system 5. Accordingly, the communication unit 51 of the communication management system 5 receives the start request information and the IP address of the source terminal (electronic whiteboard 1a) from which the start request information is transmitted. The start request information includes the terminal ID "01aa" of the source terminal (electronic whiteboard 1a) and the terminal ID "01ba" of the destination terminal (electronic whiteboard 1b).

At S63, the storing and reading processing unit 59 changes the operation state in each of records including the terminal ID "01aa" and the terminal ID "01ba" to "COMMUNICATING" in the terminal management table (FIG. 10B) based on the terminal ID "01aa" of the source terminal (electronic whiteboard 1a) and the terminal ID "01ba" of the destination terminal (electronic whiteboard 1b) included in the start request information. In this state, the source terminal (electronic whiteboard 1a) and the destination terminal (electronic whiteboard 1b) have not started a videoconference but are in a call status. In this case, when a third electronic whiteboard tries to make a call with the source terminal (electronic whiteboard 1a) or the destination terminal (electronic whiteboard 1b), a notification sound or display indicating a busy status is output.

Next, a description is given of operation of executing a session for selecting the relay device 3 to be used. At S64, the generation unit 53 of the communication management system 5 generates a session ID used for execution of the session for selecting the relay device 3. In this embodiment, a description is given of an example case in which the session ID "se01" is generated.

At S65, the storing and reading processing unit 59 stores the session ID "se01" generated at S64, the terminal ID "01aa" of the source terminal (electronic whiteboard 1a), and the terminal ID "01ba" of the destination terminal (electronic whiteboard 1b) in association with each other in the session management table (FIG. 11B).

At S66, the selection unit 54 of the communication management system 5 illustrated in FIG. 7A selects the relay device 3 for relaying a call between the two sites where the source terminal (electronic whiteboard 1a) and the destination terminal (electronic whiteboard 1b) are located, based on the relay device management table (FIG. 11C) and the terminal management table illustrated (FIG. 10B). Specifically, the selection unit 54 selects, among the relay device IDs corresponding to the relay devices whose operation statuses are "ONLINE" in the relay device management table (FIG. 11C), the relay device ID corresponding to the relay device 3 whose IP address is close to the IP address of the source terminal (electronic whiteboard 1a) in the terminal management table (FIG. 11B). The following description is given of an example case where the relay device 3 identified by the relay device ID "111a" is selected.

At S67-1, when the relay device selection process at S66 is completed, the communication unit 51 of the communication management system 5 transmits relay device selection information to the source terminal (electronic whiteboard 1a). Thereby, the source terminal (electronic whiteboard 1a) acquires the IP address of the communication management system 5, which is the transmission source of the relay device selection information. The relay device selection information includes the IP address of the relay device 3 selected at S66 and the session ID "se01" generated at S64.

At S67-2, the communication unit 51 of the communication management system 5 transmits the relay device selection information to the destination terminal (electronic whiteboard 1b). Thereby, the destination terminal (electronic whiteboard 1b) acquires the IP address of the communication management system 5, which is the transmission source of the relay device selection information, in execution of a session with the session ID "se01". The relay device selection information includes the IP address of the relay device 3 selected at S66, the terminal ID "01aa" of the source terminal (electronic whiteboard 1a), and the session ID "se01" generated at S64.

At S68-1, in response to the process of S67-1, the communication unit 11a of the source terminal (electronic whiteboard 1a) transmits reception completion information indicating that the relay device selection information is received at S67-1 to the communication management system 5. Thereby, the communication management system 5 acknowledges that the transmission of the relay device selection information, executed with the specific session ID "se01" has been completed. The reception completion information includes the session ID transmitted and received in the process of step S67-1.

At S68-2, in response to the process of S67-2, the destination terminal (electronic whiteboard 1b) also transmits the reception completion information indicating that the relay device selection information has been received through the process of S67-2 to the communication management system 5. The communication management system 5 acknowledges that the transmission of the relay device selection information, executed with the specific session ID "se01", has been completed.

Thus, the electronic whiteboard 1*a* and the electronic whiteboard 1*b* perform a video conference by exchanging image data and audio data through the relay device 3 selected at S66.

Operation of Communicating Document Image

Figure 15:
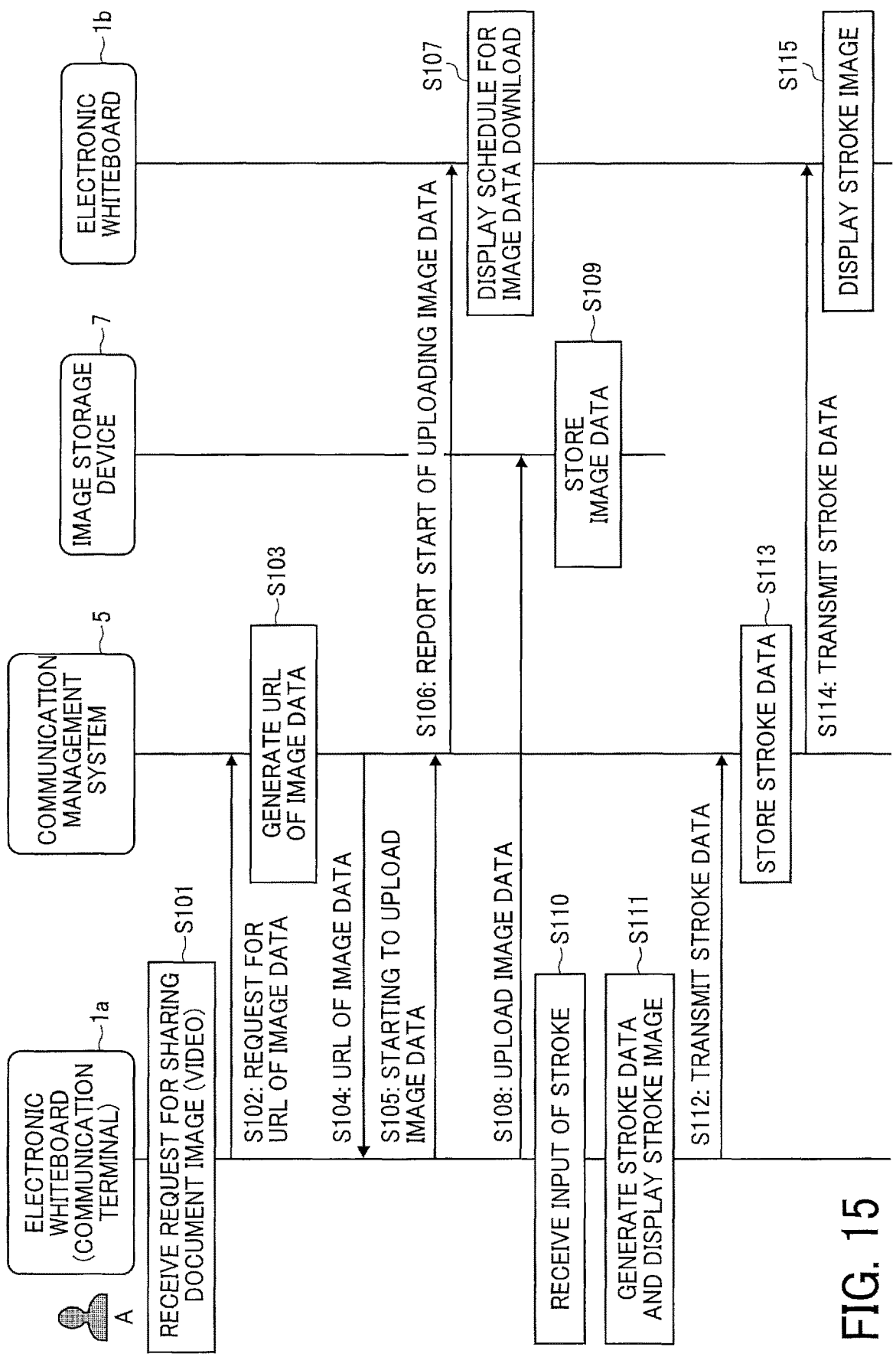
FIG. 15 is a sequence diagram illustrating operation for sharing image data of a document image and stroke data of a stroke image, performed by the communication system, according to the embodiment.
Figure 16:
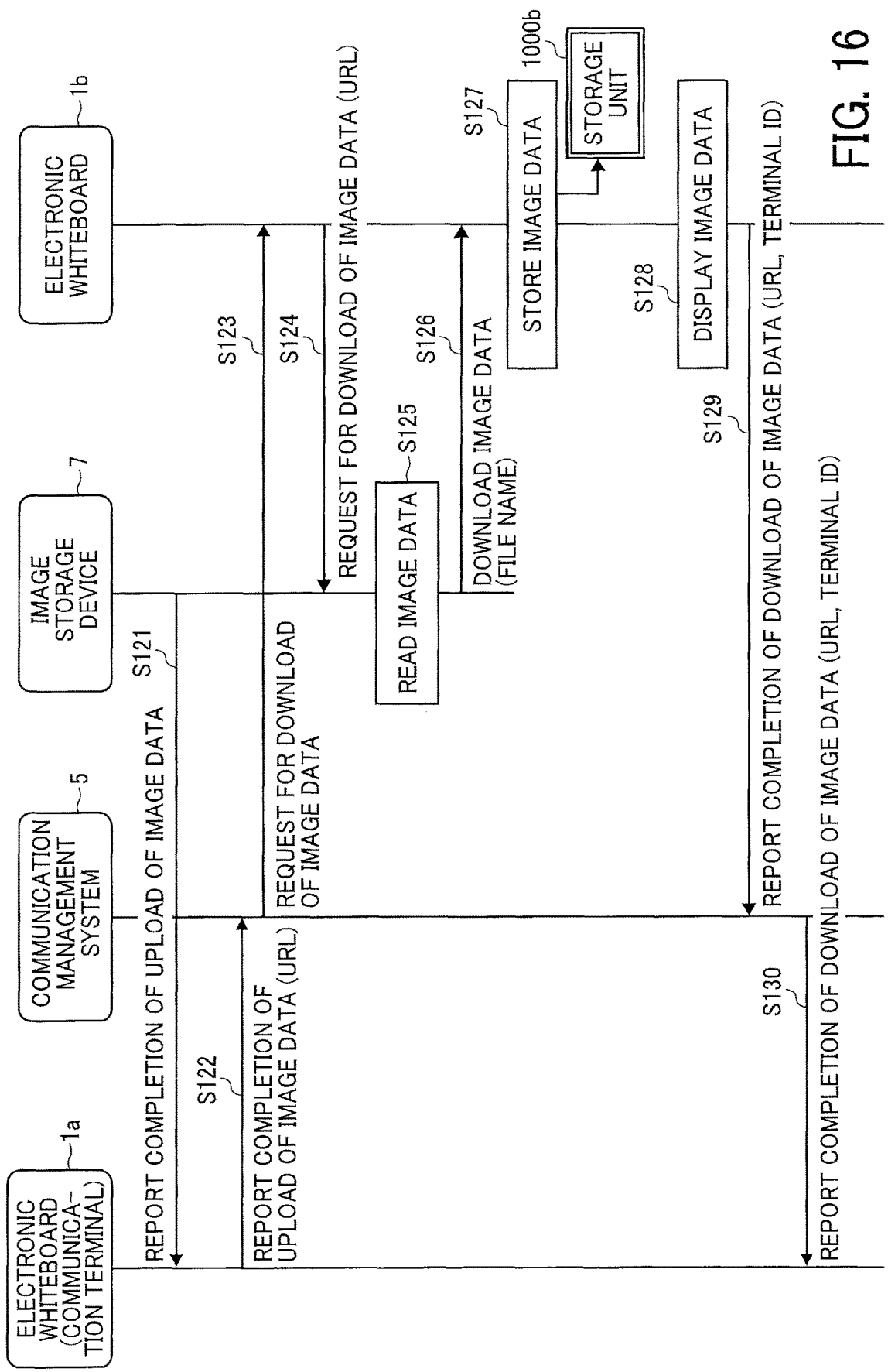
FIG. 16 is a sequence diagram illustrating example processing of uploading and downloading of image data of a document image, performed by the communication system, according to the embodiment.
Figure 17A:
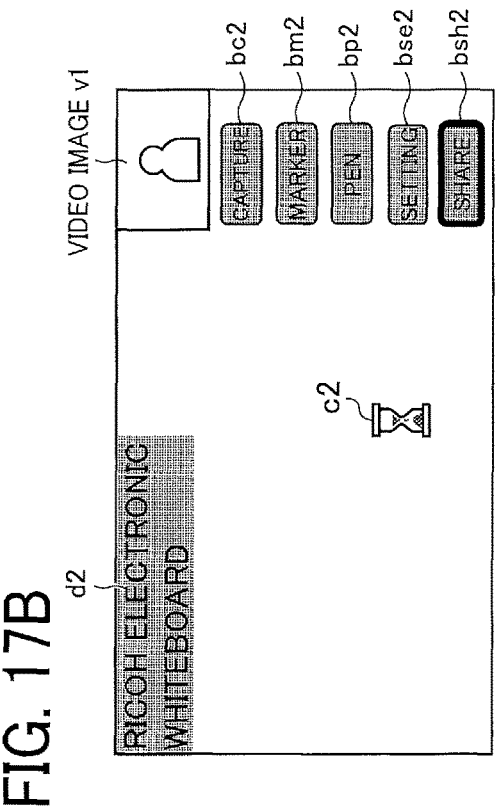
FIG. 17A is an example screen of the source electronic whiteboard.
Figure 17B:
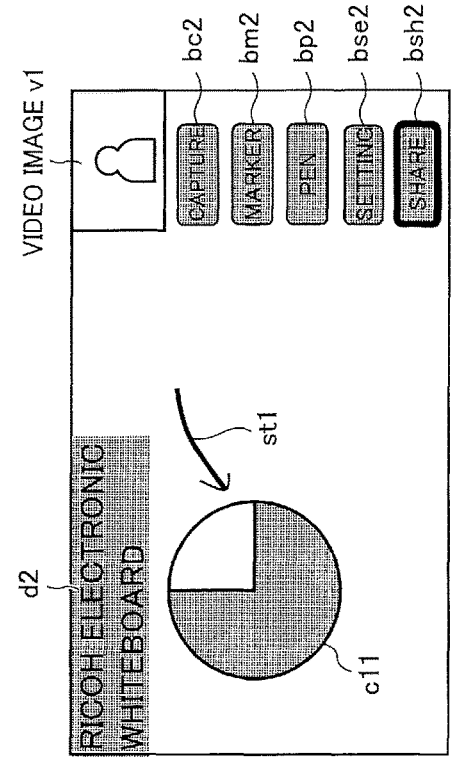
FIG. 17B is an example screen of the destination electronic whiteboard.
Figure 17C:
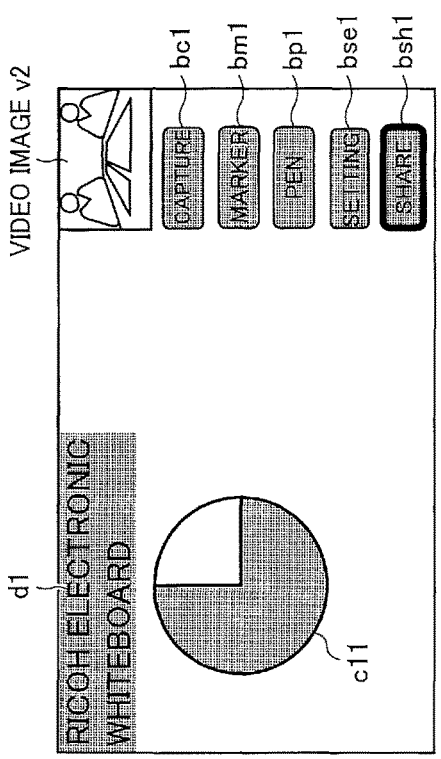
FIG. 17C is another example screen of the source electronic whiteboard.
Figure 17D:
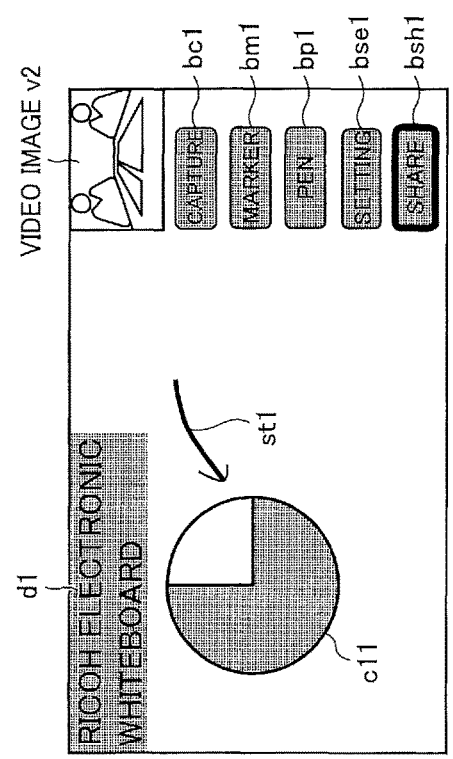
FIG. 17D is another example screen of the destination electronic whiteboard.

A description is now given of operation of communicating a document image displayed on the electronic whiteboard 1 and a stroke image input to the electronic whiteboard 1, with reference to FIG. 15 to FIG. 17D. FIG. 15 is a sequence diagram illustrating operation for sharing image data of a document image and stroke data of a stroke image, according to the embodiment. FIG. 16 is a sequence diagram illustrating example processing of uploading and downloading of image data of a document image. In the present embodiment, the electronic whiteboard 1*a* and the electronic whiteboard 1*b* share data, such as the image data of the document image and the stroke data of the stroke image. Specifically, it is assumed that the document image displayed and the stroke image input at the electronic whiteboard 1*a* are also displayed at the electronic whiteboard 1*b*. FIGS. 17A to 17D are example screens displayed on each of the electronic whiteboards 1*a* and 1*b* through processing of FIGS. 15 and 16. FIG. 17A is a screen example of the electronic whiteboard 1*a*. FIG. 17B is a screen example of the electronic whiteboard 1*b*. FIG. 17C is another screen example of the electronic whiteboard 1*a*. FIG. 17D is another screen example of the electronic whiteboard 1*b*.

The display control unit 14*a* of the electronic whiteboard 1*a* at the site A, displays on the display 180 the screen illustrated in FIG. 17A. The displayed contents are the document image c11, the background image d1, the video v2, the "share" button bsh1, "set" button bse1, "pen" button bp1, "marker" button bm1, and "capture" button bc1. The document image c11 is, for example, an image containing a pie chart, displayed based on document image data. The background image d1 is, for example, an image including a string of characters "Ricoh Electronic Whiteboard". The video v2 is, for example, a video image in which two persons (users B1 and B2) at the site B are sitting face-to-face on a table. At S101, in this state, when the user A1 of the electronic whiteboard 1*a* performs an operation such as pressing or tapping the "share" button bsh1, the receiving unit 12*a* receives a request for sharing the document image (video image) from the user A1. In the screen example illustrated in FIG. 17A, in response to selection, the "share" button bsh1 is highlighted or the outer frame of the button bsh1 is displayed thick, for example.

At S102, the communication unit 11*a* transmits request information indicating a request for a URL indicating the storage location of document image data, which is image data of the document image being displayed, to the communication management system 5. Thereby, the communication unit 51 of the communication management system 5 receives the request information. The URL is an example of storage location information. In another example, the storage location information includes a uniform resource identifier (URI).

At S103, the generation unit 53 of the communication management system 5 generates a URL indicating the storage location of the document image data.

At S104, the communication unit 51 transmits the URL indicating the storage location of the document image data generated by the generation unit 53 to the electronic whiteboard 1*a*. Thereby, the communication unit 11*c* of the electronic whiteboard 1*a* receives the URL indicating the storage location of the document image data.

At S105, the communication unit 11*a* of the electronic whiteboard 1*a* transmits an upload start notice of the document image data to the communication management system 5. Thereby, the communication unit 51 of the communication management system 5 receives the upload start notice.

At S106, the communication unit 51 transfers the upload start notice to the electronic whiteboard 1*b* participating in the remote conference. Thereby, the communication unit 11*b* of the electronic whiteboard 1*b* receives the upload start notice.

At S107, the display control unit 14*b* of the electronic whiteboard 1*b* at the site B, displays on the display 180 the screen illustrated in FIG. 17B. Here, a "share" button bsh2 selected for sharing the video v1 of the site A, a "setting" button bse 2, a "pen" button bp2, a "marker" button bm2, and a "capture" button bc2 are displayed at respectively the same locations where the corresponding buttons are displayed in the screen, displayed by the display 180 of the electronic whiteboard 1*a*. The display control unit 14*b* displays an hourglass icon c2 that visually indicates the progress in downloading the document image data, in response to the upload start notice received at S106.

In this example, elapsed time, which reflects the progress, can be indicated by a still-image hourglass or an animated hourglass with the change in amount of sand in the hourglass. The icon c2 of the hourglass is an example of schedule information indicating that the image data is scheduled to be downloaded. Other examples of progress information may be any icon other than hourglass icon, for example, a clock icon, character (and/or symbol) instead of icon, or combination of icon and character (and/or symbol). The progress information may be output as a notification by sound. In this case, instead of the display control unit 14*a*, the image and audio processing unit 13*a* controls the speaker 150 to output the sound.

The electronic whiteboard 1*a* may perform the process of step S102 after the process of step S105. Further, S104 and S105 may be performed in reverse order. That is, the communication management system 5 may transmit the URL indicating the storage location of the document image data at S104 after receiving the upload start notice of the document image data at S105.

At 5108, the communication unit 11*a* of the electronic whiteboard 1*a* uploads the document image data to the image storage device 7 at the URL received at S104. Thereby, the communication unit 71 of the image storage device 7 receives the document image data. At S109, the storing and reading processing unit 79 of the image storage device 7 stores the document image data in the storage location indicated by the URL in the storage unit 7000.

Communication Processing of Stroke Image

Subsequently, at the site A, the user A1 moves the electronic pen 190 or the hand H in contact with the display 180 on the electronic whiteboard 1*a*, and the receiving unit 12*a* receives an input of a movement stroke at S110. In the present embodiment, the movement stroke is used as a trajectory drawn using the electronic pen 190 or the hand H.

The image processing unit 17*a* generates stroke data (for example, coordinate data (x, y)) for displaying a stroke image on the display 180, which is a two-dimensional display, based on the input stroke of the user A1. At S111, at the same time, the display control unit 14a displays the stroke image on the display 180 of the electronic whiteboard 1a. As a result, as illustrated in FIG. 17C, a stroke image st1, represented by a curved arrow, is displayed. As described referring to FIG. 17A, in FIG. 17C, the displayed contents such as the document image c11, the background image d1, the video v2, the "share" button bsh1, "setting" button bse1, "pen" button bp1, "marker" button bm1, and "capture" button bc1, are also displayed on the display 180 of the electronic whiteboard 1a.

At S112, the communication unit 11a transmits the stroke data generated at S111 for reproducing the stroke image to the communication management system 5. Thereby, the communication unit 51 of the communication management system 5 receives the stroke data of the stroke image, transmitted from the electronic whiteboard 1a.

At S113, the storing and reading processor 59 of the communication management system 5 stores the stroke data.

At S114, the communication unit 51 transfers the stroke data to the electronic whiteboard 1b, which is the counterpart terminal. Thereby, the communication unit 11b of the electronic whiteboard 1b receives the stroke data transmitted from the communication management system 5.

At S115, the image processing unit 17b of the electronic whiteboard 1b generates a stroke image based on the stroke data received at S114, and the display control unit 14b controls the display 180 of the electronic whiteboard 1b to display the stroke image. As illustrated in FIG. 17D, the electronic whiteboard 1b displays a stroke image st1 represented by the same curved arrow as that of the stroke image st1 displayed on the electronic whiteboard 1a at the other site (source terminal). In FIG. 17D, the displayed contents such as the document image c11, the background image d2, the video v1, the "share" button bsh2, "setting" button bse2, "pen" button bp2, "marker" button bm2, and "capture" button bc2, are also displayed on the display 180 of the electronic whiteboard 1b.

Now referring to FIG. 16, at S121, the communication unit 71 of the image storage device 7 transmits an upload completion notice indicating that the upload of the document image data is completed to the electronic whiteboard 1a. Accordingly, the communication unit 11a of the electronic whiteboard 1a receives the upload completion notice transmitted from the image storage device 7.

At S122, the communication unit 11a of the electronic whiteboard 1a transmits the upload completion notice indicating completion of uploading the document image data to the communication management system 5. Thereby, the communication unit 51 of the communication management system 5 receives the upload completion notice. The completion notice includes the URL of the image data received at S104.

Then, at S123, the communication unit 51 transfers the upload completion notice including the URL to the electronic whiteboard 1b, which is a counterpart communication terminal. Thereby, the communication unit 11b of the electronic whiteboard 1b receives the upload completion notice from the communication management system 5.

At S124, the communication unit 11b of the electronic whiteboard 1b transmits download request information indicating a request for downloading the document image data by accessing the URL indicating a storage location at the image storage device 7 received at S123. Thereby, the communication unit 71 of the image storage device 7 receives the request information indicating the download request transmitted from the electronic whiteboard 1b.

At S125, the storing and reading processing unit 79 of the image storage device 7 reads the document image data, which is a request target, from the storage unit 7000 based on the URL. At S126, the communication unit 71 transmits the requested document image data to the electronic whiteboard 1b as the terminal that has requested. Thereby, the communication unit 11b of the electronic whiteboard 1b downloads (receives) the document image data, from the image storage device 7.

At S127, the storing and reading processing unit 19b stores the document image data that is downloaded in the storage unit 1000b.

At S128, the display control unit 14b of the electronic whiteboard 1b causes the display 180 to display the document image, based on the document image data which is downloaded. That is, the display control unit 14b of the electronic whiteboard 1b cause the display 180 to display the same document image as the document image c11 illustrated in FIG. 17C on the screen illustrated in FIG. 17D and stops displaying the hourglass icon c2 displayed until then.

At S129, the communication unit 11b of the electronic whiteboard 1b transmits the download completion notice of the document image data (video) to the communication management system 5. Thereby, the communication unit 51 of the communication management system 5 receives the download completion notice of the document image data from the electronic whiteboard 1b.

At S130, the communication unit 51 transmits a download completion notice of the document image data to the electronic whiteboard 1a. Thereby, the communication unit 11a of the electronic whiteboard 1a receives the download completion notice of the document image data from the communication management system 5.

Process to Control Screen Capturing

Figure 18:
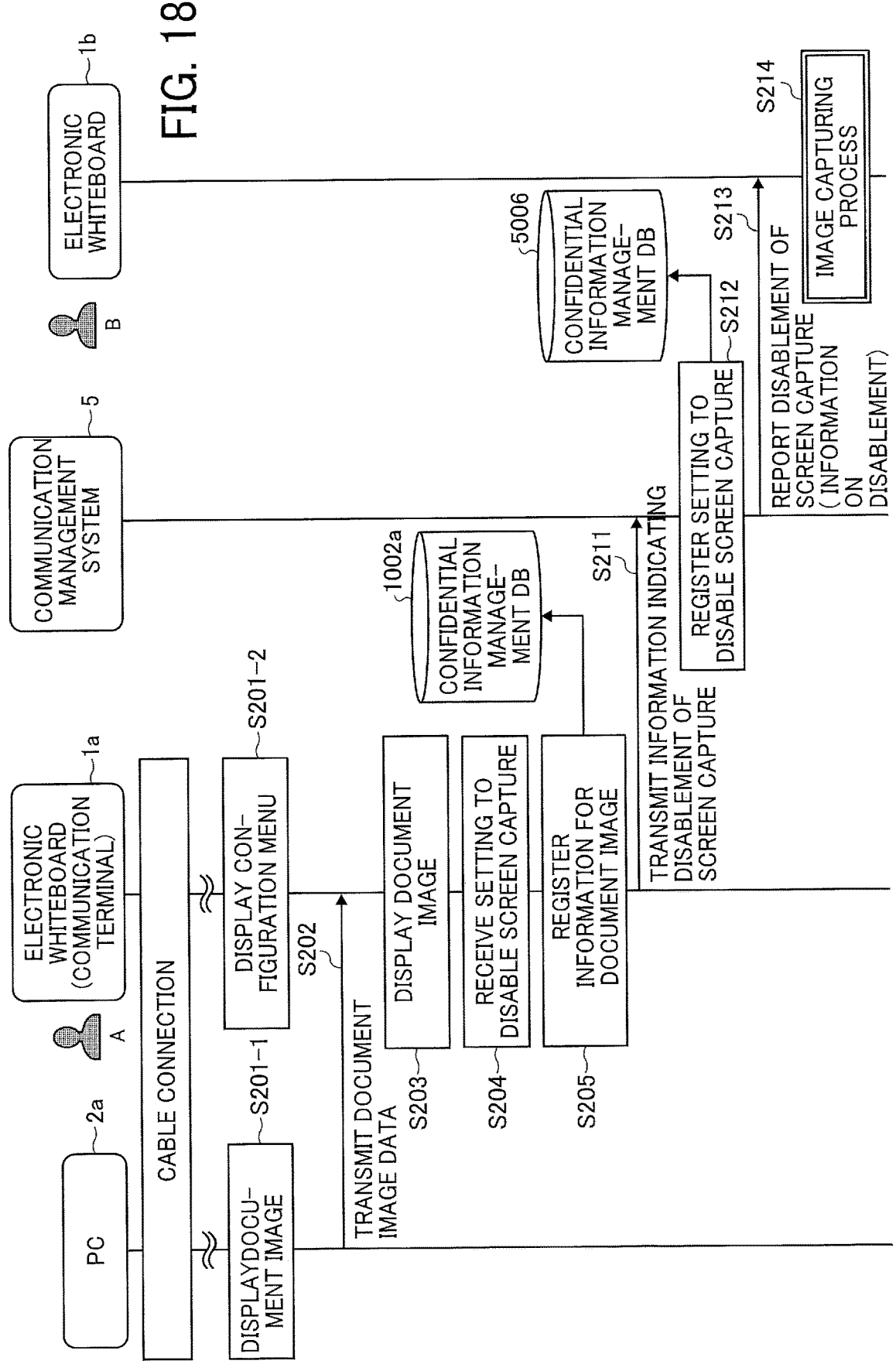
FIG. 18 is a sequence diagram illustrating example processing to prohibit screen capturing, send notification, and capture screen, performed by the communication system.

Next, as example to control screen capturing, processing to prohibit screen capturing, processing to transmit notification, and processing to capture screen are described according to the embodiment. FIG. 18 is a sequence diagram illustrating example processing to control screen capturing. As illustrated in FIG. 18, the PC 2a and the electronic whiteboard 1a (or the PC 2b and the electronic whiteboard 1b) in the information communication system 8 are connected to each other via, for example, a VGA cable, an HDMI cable, or the like. At this time, initial setting to establish communications between devices in the information communication system 8 is performed according to a certain communication standard such as VGA and HDMI. Since the initial setting to establish communication is a well-known technique, description thereof will be omitted.

At S201-1, the display control unit 24a of the PC 2a displays the document image (video) on the display 206. At S201-2, the display control unit 14a of the electronic whiteboard 1a displays a plurality of selection buttons (or icons) at predetermined positions on the display 180 of the electronic whiteboard 1a. Hereinafter, the plurality of selection buttons may be simply referred to as "selection button". The selection buttons include, for example, the "share" button bsh1, "setting" button bse1, "pen" button bp1, "marker" button bm1, and "capture" button bc1. Among these selection buttons, the "share" button bsh1 is a button operated to request sharing of the document image c11 with the site B. The "setting" button bse1 is operated to set various operation modes of the electronic whiteboard 1. When the "setting" button bse1 is operated by, for example, the user A1, another operation button such as a "security" button or a "power save" button appears. As described above, the "setting" button bse1 may be a function button having two or more setting functions. In the present embodiment, the "setting" button bse1 ("setting" button bse2) functions as an example of a prohibition receiving unit that receives an instruction to prohibit (disable) capturing of a screen based on screen data by another communication terminal. Since the processes of S201-1 and S201-2 described above are asynchronous processes, any step may be executed first.

The "pen" button bp1 is, for example, a button operated to select a pen mode for inputting a stroke image or the like using the electronic pen 190. For example, the "marker" button bm1 is a button operated to select a marker mode for displaying a trajectory on the surface of the display 180, which is traced with the hand H or the like, as a marker (for example, the thick, colored line, which may be referred to as a pointer). The "capture" button bc1 ("capture" button bc2) is a button that is operated to capture a screen displayed on the display 180 (screen capture is performed), and is an example of capturing acceptance unit. The "share" button bsh1, the "setting" button bse1, the "pen" button bp1, the "marker" button bm1, and the "capture" button bc1 are displayed side by side (arranged) on the right side of the display 180 in the present embodiment. Any one of the above-described selection buttons may be displayed in the form of a selection icon. Further, these selection buttons may be arranged and displayed in any order.

At S202, the communication unit 11a of the PC 2a transmits the image data representing the document image (video), started to be displayed at S201-1, to the electronic whiteboard 1a. The providing and obtaining unit 18a of the electronic whiteboard 1a acquires the document image (video) transmitted from the PC 2a via the communication unit 11a. That is, in the present embodiment, the providing and obtaining unit 18a (the providing and obtaining 18b) functions as an example of an acquirer that acquires image data provided by the PC 2 (information processing apparatus).

Subsequently, at S203, the display control unit 14a displays the document image (video) displayed at the PC 2, on the display 180, based on the image data representing the document image (video) that is received. At this time, the display control unit 14a displays each layer structure illustrated in FIGS. 3A and 3B on the display 180.

Subsequently, at S204, the receiving unit 12a receives an operation on the selection button displayed on the display 180, that is, a request for prohibiting (disabling) screen capturing. In this example, the instruction to prohibit screen capturing is also referred to as processing to conceal information. The instruction to prohibit screen capturing, at S204, instructs one of "all" (all pages are made confidential), "partial" (designated pages are made confidential)", and "none" (no pages are made confidential). Although it will be described in detail later, a user may manually input information on a page (screen) of the document to be concealed, via a user interface displayed on the display 180 of the electronic whiteboard 1. Alternatively, the process of S204 may be performed before S203 or before the start of an event such as a meeting during which a target document is used.

Subsequently, at S205, the storing and reading processing unit 19a stores and registers the information corresponding to the selection button received at the receiving unit 12a, in the confidential information management DB 1002a, as setting information for the document image (video). The information registered in the confidential information management DB 1002a at this time is information obtained in relation to the instruction to prohibit screen capturing, in response to operation on the "setting" button bse1 by the user A1, and includes such as the "confidentiality range" and the "confidential page number" in FIG. 9A. For simplicity, information on confidentiality range is referred to as confidential setting information, and information on confidential page number is referred to as confidential page information. On the other hand, the "meeting ID" and the "document ID" may be stored and registered at the time when the document image (video) is received from the PC 2a at S202. As described above, in the present embodiment, the storing and reading processing unit 19a (the storing and reading processing unit 19b) functions as an example of a storage control unit that causes the storage unit to store identification information identifying the document image (document ID) in association with the meeting ID.

After registration of the confidential setting information and the confidential page information of the document image (video) by the storing and reading processing unit 19a, at S211, the communication unit 11a transmits to the communication management system 5 the information obtained in relation to the instruction to prohibit screen capturing, such as the confidential setting information (the congeniality range) and the confidential page information (the confidential page number). Accordingly, the communication unit 51 of the communication management system 5 receives the confidential setting information and confidential page information, transmitted by the electronic whiteboard 1a. Accordingly, in the present embodiment, the communication unit 11a (communication unit 11b) functions as an example of a transmission unit that transmits information on the instruction to prohibit screen capturing, which is stored in association with the identification information for identifying the document image, so that the other communication terminal can receive the information on the instruction to prohibit screen capturing.

At S212, the storing and reading processing unit 59 stores and registers the information on the instruction to prohibit screen capturing, in particular, confidentiality range and confidential page number, received by the communication unit 51, in the confidential information management table (confidential information management DB 5006). The confidential information management table (confidential information management DB 5006) may also be provided on the electronic whiteboard 1b.

At S213, the communication unit 51 transmits a notification indicating prohibition (disablement) of screen capturing to the electronic whiteboard 1b. Thereby, the communication unit 11b of the electronic whiteboard 1b receives the notification indicating prohibition (disablement) of screen capturing, transmitted from the communication management system 5. At this time, the storing and reading processing unit 19b may construct a database similar to the confidential information management DB 1002a illustrated in FIG. 9A, in the storage unit 1000b, and store a confidential information management table on that database. In this case, the information on confidentiality range (all, partial, and none) and the confidential page number, received with the notification indicating prohibition (disablement) of screen capturing at S213 described above, may be stored in association with the document ID.

Thereafter, at S214, the determination unit 55 executes screen capturing in response to operation on the "capture" button bc2. The details of processing at S214 will be described referring to the flowchart described later.

In the information processing system 8 according to the present embodiment, in performing the process of S202, another device may exist between the PC 2 (information processing apparatus) and the electronic whiteboard 1 (communication terminal). In other words, information transmitted and received between the PC 2 and the electronic whiteboard 1 may be transmitted and received via another device. Further, in the communication system according to the present embodiment, in performing the process of S211, another device may exist between the electronic whiteboard 1a (communication terminal) and the communication management system 5. In other words, information transmitted and received between the electronic whiteboard 1a and the communication management system 5 may be transmitted and received via another device. Further, in the communication system according to the present embodiment, in performing the process of S213, another device may exist between the communication management system 5 and the electronic whiteboard 1b (communication terminal). In other words, information transmitted and received between the communication management system 5 and the electronic whiteboard 1b may be transmitted and received via another device.

Flowchart of Screen Capturing at Electronic Whiteboard as Destination Terminal

Figure 19:
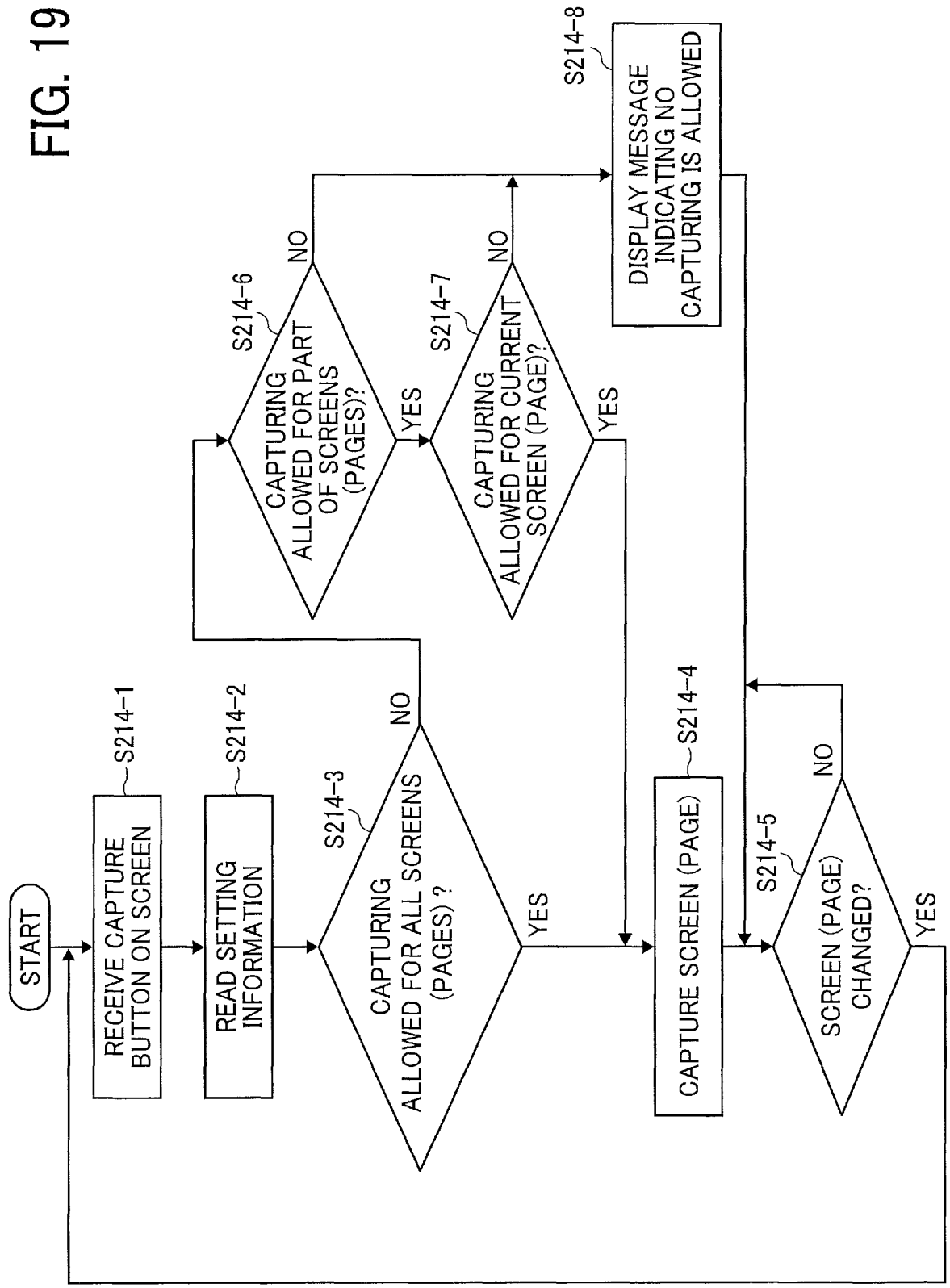
FIG. 19 is a flowchart illustrating example processing to capture screen, displayed at the destination electronic whiteboard, according to the present embodiment.

FIG. 19 is a flowchart illustrating example processing to capture screen, displayed at the electronic whiteboard 1b, according to the present embodiment. The flowchart illustrated in FIG. 19 is an example of detailed processing of S214 described above. First, at S214-1, the receiving unit 12b of the electronic whiteboard 1b receives a user operation on a "capture" button bc2, which is an example of a capture receiving unit, displayed by the display 180.

Subsequently, at S214-2, the storing and reading processing unit 19b searches the confidential information management table, which is stored at S213, using the document ID for identifying the received image data as a search key, and reads the corresponding confidentiality range and confidential page number. In the present embodiment, the confidentiality range information includes information indicating "all", "partial", or "none", and is treated as an example of confidential setting information set by the user.

Next, at S214-3, the determination unit 15b determines whether or not screen capturing is allowed. Specifically, the determination unit 15b determines whether or not capturing is allowed for all pages (all screens) of the document image data that is received based on the confidentiality range information. When the entire document image (all screens) can be captured (S214-3: YES), the image processing unit 17b captures the screen displayed on the display 180 in response to the request received at S214-1, and stores the captured screen in the storage unit 1000b or the recording medium 1010b at S214-4.

Subsequently, at S214-5, the determination unit 15b determines whether or not the screen displayed on the display 180 has changed due to the change in page of the document being displayed. The process of S214-5 by the determination unit 15b may be performed by detecting a change in the page number of the document in cooperation with the image processing unit 17b, for example. When the screen displayed on the display 180 is changed (S214-5: YES), the process returns to S214-1. The process returns to step S214-1 and subsequent steps to reflect update on setting information. That is, when a document image including a plurality of pages (slides) is displayed, contents of the screen including the stroke image changes depending on the page (slide), and there is a possibility that the user changes the setting on prohibition of screen capturing, for example, in halfway during the meeting. For example, even though the user previously sets that screen capturing is enabled for all 20 pages of the document, the user may change the setting to partially prohibit screen capturing, for example, from page 8 of the document. In such a case, the result of determination at S214-3 changes. When the screen displayed on the display 180 is not changed (S214-5: NO), the determination unit 15b repeats S214-5, as the same screen is kept displayed.

In the process of S214-3 described above, when capturing is not allowed for all pages (all screens) of the document image data that is received (S214-3: NO), at S214-6, the determination unit 15b determines whether capturing is allowed for at least a part of pages (a part of the screens) of the document image data that is received.

When capturing is allowed for a part of pages (a part of the screens) of the document image data that is received (S214-6: YES), at S214-7, the determination unit 15b further determines whether capturing is allowed for the current page (current screen) that is displayed on the display 180. The process of S214-7 by the determination unit 15b is performed, for example, by comparing the received confidential page number with the page number of the screen currently displayed on the display 180. When the screen currently displayed on the display 180 can be captured (S214-7: YES), the image processing unit 17b captures the screen displayed on the display 180 in response to the request received at S214-1, and stores the captured screen in the storage unit 1000b or the recording medium 1010b.

When capturing is not allowed for a part of pages (a part of the screens) of the document image data that is received (S214-6: NO), at S214-8, the determination unit 15b determines that capturing is not allowed for all pages (all screens) of the document image data, and in cooperation with the display control unit 14b performs processing to control display based on the determination that screen capturing is prohibited. Specifically, the display control unit 14b causes the display 180 of the electronic whiteboard 1b to display a message indicating that all screens of the received document image cannot be captured, and the determination unit 15b performs processing of S214-5 described above. The display 180 at this time functions as an example of a display unit in the present embodiment.

When capturing is not allowed for the screen that is currently displayed on the display 180 (S214-7: NO), at S214-8, the determination unit 15b determines that capturing is not allowed for a part of pages (a part of screens) of the document image data, and in cooperation with the display control unit 14b performs processing to control display based on the determination that screen capturing is prohibited. Specifically, the display control unit 14b causes the display 180 of the electronic whiteboard 1b to display a message indicating that the currently-displayed screen of the received document image cannot be captured, and the determination unit 15b performs processing of S214-5 described above.

The confidential setting information (refer to FIG. 9A), such as the confidentiality range indicating "all", "partial", and "none", which is used at S214-3, S214-6, or S214-7, is an example of information instructing to prohibit capturing of a screen displayed on the display 180 at the electronic whiteboard 1b. The "partial" is an example of security setting (a method of switching between permission and prohibition of the screen capturing function) according to the display content. In this way, a screen including a stroke image can be captured on the receiver side as necessary, while keeping security at a certain level. Thus, information is shared between the transmission source and the transmission destination of the document image (video) while maintaining security.

In the present embodiment, the determination unit 15b (determination unit 15a) functions as an example of a capture prohibition unit. The above-described flowchart is an example, and content of processing or order of processing by each functional unit may be changed as appropriate.

Figure 20:
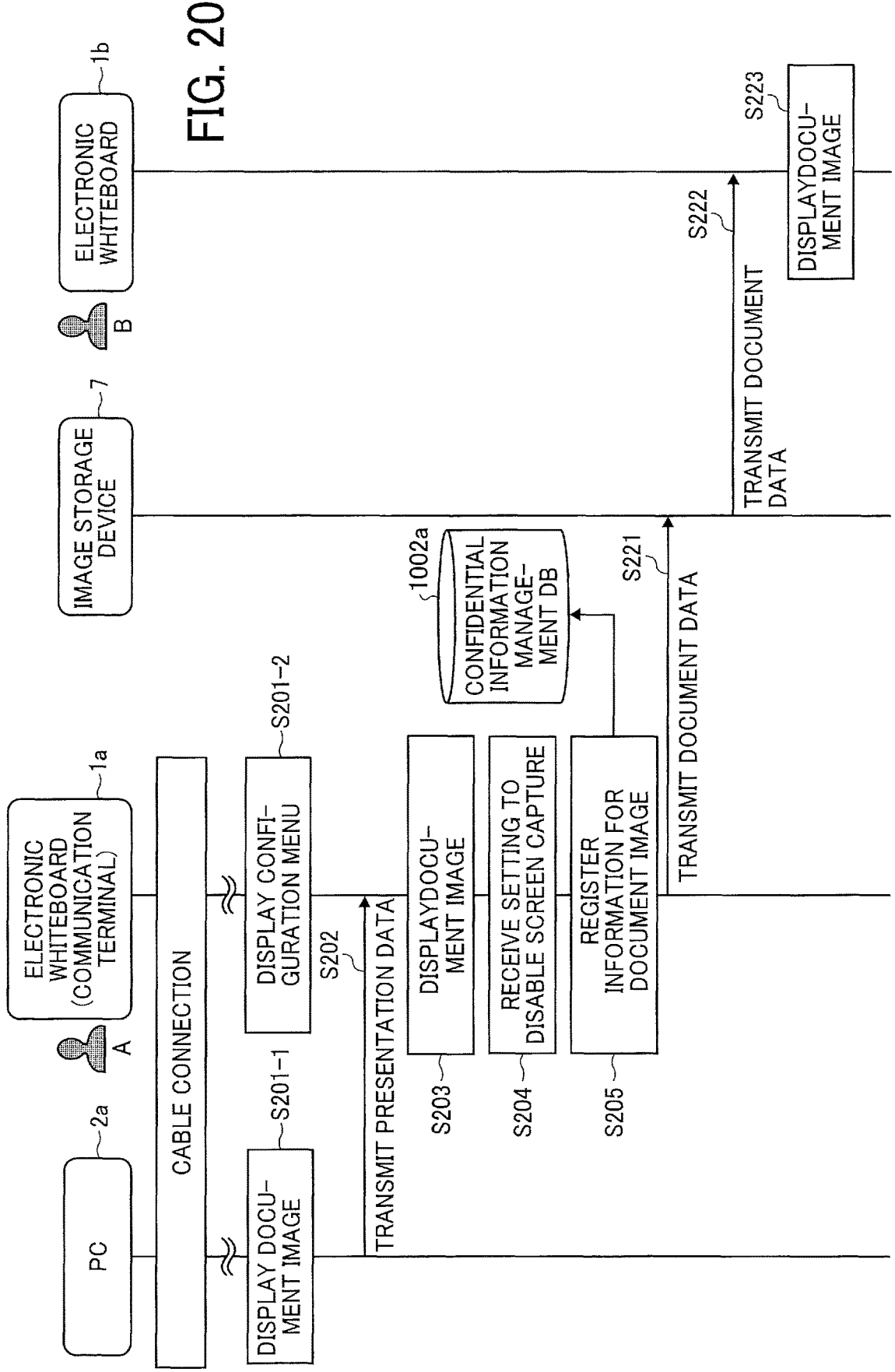
FIG. 20 is a sequence diagram illustrating example processing to control screen capturing, such as processing to prohibit screen capturing, transmit document image, and display screen, performed by the communication system, according to the embodiment.

Screen Capturing Prohibition, Document Image Transmission, and Screen Display Processing Next, processing to prohibit screen capturing, processing to transmit document image, and processing to display screen, performed by the communication system of FIG. 1, is described according to another embodiment. FIG. 20 is a sequence diagram illustrating example processing to control screen capturing, such as processing to prohibit screen capturing, transmit document image, and display screen, performed by the communication system, according to the embodiment. In FIG. 20, processing from S201 to S205, after the PC 2a and the electronic whiteboard 1a establishes a connection, is the same as the processing described with reference to FIG. 18, and thus description thereof is omitted.

At S221, the communication unit 11a transmits the document image (video) transmitted by the PC 2a to the image storage device 7. Thereby, the communication unit 71 of the image storage device 7 receives the document image (video) from the electronic whiteboard 1a.

Subsequently, at S222, the communication unit 71 transmits the document image (video) transmitted by the electronic whiteboard 1a to the electronic whiteboard 1b. Accordingly, the communication unit 11b of the electronic whiteboard 1b receives the document image (video) transmitted from the image storage device 7.

At S223, the display control unit 14b of the electronic whiteboard 1b controls the display 180 to display the document image (video) received at the communication unit 11b.

Example Display Screens

Examples of screens displayed on the electronic whiteboard 1a and the electronic whiteboard 1b in the processes described with reference to FIGS. 18 to 20 will be described. FIG. 21A is an example screen of the electronic whiteboard 1a. FIG. 21B is an example security setting screen of the electronic whiteboard 1a. FIG. 21C is an example screen when all screens are set confidential, displayed at the electronic whiteboard 1a. FIG. 21D is an example screen of the electronic whiteboard 1b, when all screens are set confidential, displayed at the electronic whiteboard 1a.

Example of Making all Pages of Document Image Confidential

FIG. 21A illustrates an example screen, which is displayed at the electronic whiteboard 1a, in response to operation on the "setting" button bse1 by the user at S204. At this time, in order to distinguish the "setting" button bse1 from other selection buttons, the display control unit 14a displays a border of the "setting" button 14a (icon) with a thick line, or makes the "setting" button bse1 highlighted.

FIG. 21B is an example screen, which is displayed at the electronic whiteboard 1a, in response to operation on the "setting" button bse1 by the user (for example, a meeting organizer), during when the electronic whiteboard 2 is in the state of FIG. 21A. When the user operates the "setting" button bse1, the display control unit 14a displays, for example, a setting menu represented by a balloon 1801, on the screen of the display 180. The setting menu includes setting buttons such as "security" and "power save". While setting buttons may be icons, the setting buttons and icons may be simply referred to as buttons.

FIG. 21C illustrates an example screen, displayed at the electronic whiteboard 1a, when the user A selects the "security" button in the state of FIG. 21B. When the user A selects the "security" button, the display control unit 14a displays a balloon 1802 instead of the balloon 1801. The balloon 1802 includes setting buttons and operation buttons for "all pages confidential", "this page confidential", "OK", and "cancel". FIG. 21C illustrates an example case in which the user A starts writing a character "P" next to the stroke image st1 (handwritten, leftward curved arrow). In such case, the user may recognize a need for making the content confidential. In this example, it is assumed that the user A selects the "all pages confidential" button and presses the "OK" button. The confidential setting information, input by the user in FIG. 21C, is stored as the confidentiality range in the confidential information management table (confidential information management DB 1002a) illustrated in FIG. 9A in association with the meeting ID or the document ID.

FIG. 21D is an example screen, displayed at the electronic whiteboard 1b, when prohibition of screen capturing is not allowed for all screens ("all pages confidential"), according to the operation input by the user A using the electronic whiteboard 1a as illustrated in FIG. 21C. In this case, when the user B1 or B2 who uses the electronic whiteboard 1b operates the "capture" button bc2, the display control unit 14b displays a message 1803 on the display 180. Specifically, the display control unit 14b displays, on the display 180, for example, a message indicating that "capturing of all screens in this meeting cannot is not allowed". That is, all the screens including the screen that contains the leftward curved arrow and the character of "profit ratio of product A", as the stroke image written by the user A at the electronic whiteboard 1a (FIG. 21C), are not captured.

Example of Making a Part of Document Image Confidential

Figure 22A:
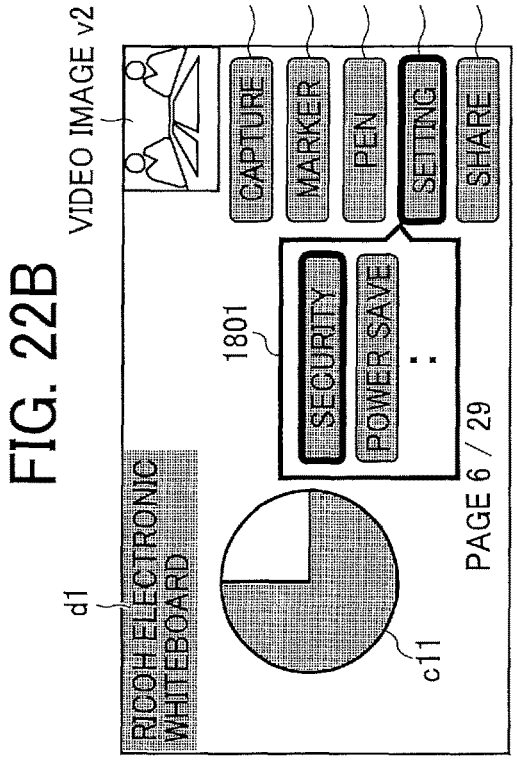
FIG. 22A is an example screen of the source electronic whiteboard.
Figure 22B:
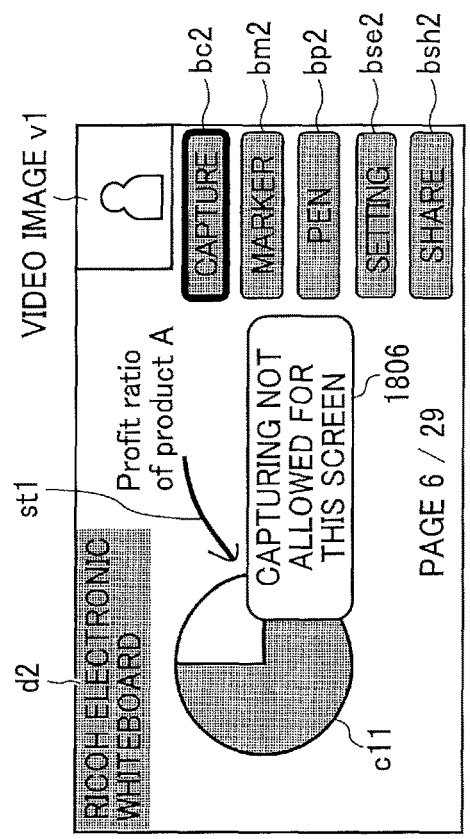
FIG. 22B is an example security setting screen of the source electronic whiteboard.
Figure 22C:
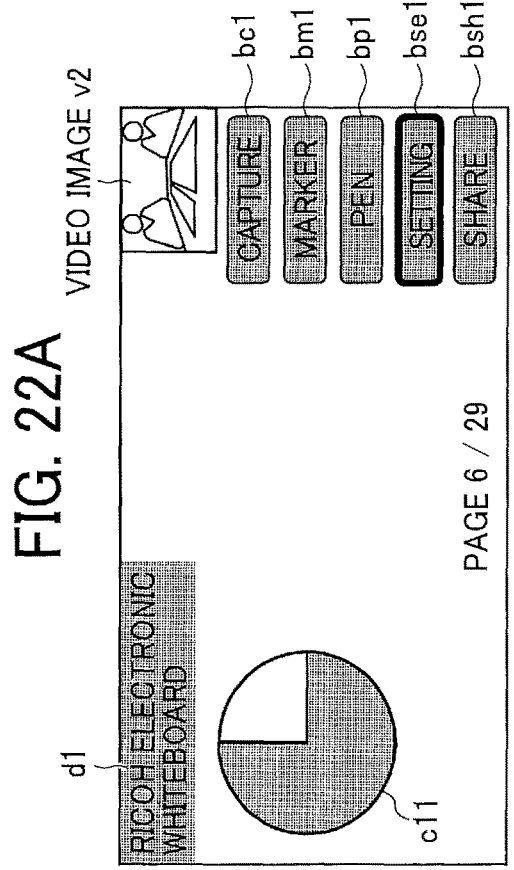
FIG. 22C is an example screen when a part of screens are set confidential, displayed at the source electronic whiteboard.
Figure 22D:
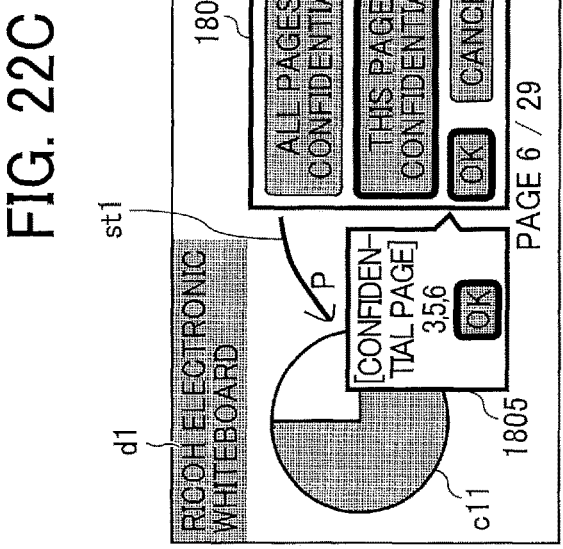
FIG. 22D is an example screen of the destination electronic whiteboard when a part of screens are set confidential.

FIG. 22A is an example screen of the electronic whiteboard 1a. FIG. 22B is an example security setting screen of the electronic whiteboard 1a. FIG. 22C is an example screen when a part of screens are set confidential, displayed at the electronic whiteboard 1a. FIG. 22D is an example screen of the electronic whiteboard 1b when all screens are set confidential, displayed at the electronic whiteboard 1a.

The screens of FIGS. 22A and 22B are the same as those in FIGS. 21A and 21B. Referring to FIG. 22C, when the user A writes a character "P" next to the stroke image st1 (handwritten, leftward curved arrow), the user may recognize a need for making such content confidential. In this example, it is assumed that the user A selects the "this page confidential" button and presses the "OK" button in the balloon 1804. When the "this page confidential" button is selected, the display control unit 14a further displays a balloon 1805 next to the balloon 1804. The balloon 1805 displays the page 6/29 (page 6) indicating a page number of the currently-displayed screen, in addition to the confidential pages 3 and 5, which have been previously set to be confidential. The balloon 1805 further displays an "OK" button below the confidential page information. The confidential setting information, input by the user in FIG. 22C, is stored as the confidentiality range in the confidential information management table (confidential information management DB 1002a) illustrated in FIG. 9A in association with the meeting ID or the document ID. The confidential page information, input by the user in FIG. 22C, is stored as the confidentiality page number in the confidential information management table (confidential information management DB 1002a) illustrated in FIG. 9A in association with the meeting ID or the document ID. More specifically, in this example, the confidential page number "6" is added to the "confidential page number" field in the table in which the page numbers "3" and "5" are already stored.

FIG. 22D is an example screen, displayed at the electronic whiteboard 1b, when prohibition of screen capturing is not allowed for currently-displayed screen ("this page confidential"), according to the operation input by the user A using the electronic whiteboard 1a as illustrated in FIG. 22C. In this case, when the user B1 or B2 who uses the electronic whiteboard 1b operates the "capture" button bc2, the display control unit 14b displays a message 1806 on the display 180. Specifically, the display control unit 14b displays, on the display 180, for example, a message indicating that "capturing of this screen is not allowed". That is, the screen that contains the leftward curved arrow and the character of "profit ratio of product A", as the stroke image written by the user A at the electronic whiteboard 1a (FIG. 22C), is not captured.

Example of Making None of Document Image Confidential

The following describes an example case in which screen capturing is allowed. FIG. 23A is an example screen of the electronic whiteboard 1a. FIG. 23B is an example security setting screen of the electronic whiteboard 1a. FIG. 23C is an example screen when none of screens is set confidential, displayed at the electronic whiteboard 1a. FIG. 23D is an example screen of the electronic whiteboard 1b when none of screens is set confidential.

FIG. 23A illustrates an example screen, which is displayed at the electronic whiteboard 1a, in response to operation on the "setting" button bse1 by the user at S204. At this time, in order to distinguish the "setting" button bse1 from other selection buttons, the display control unit 14a displays a border of the "setting" button 14a (icon) with a thick line, or makes the "setting" button bse1 highlighted. In FIG. 23A, the electronic whiteboard 1a displays an image that contains an island and sea, as a document image c12, on the display 180.

FIG. 23B is an example screen, which is displayed at the electronic whiteboard 1a, in response to operation on the "setting" button bse1 by the user (for example, a meeting organizer), during when the electronic whiteboard 2 is in the state of FIG. 23A. When the user operates the "setting" button bse1, the display control unit 14a displays, for example, a setting menu represented by a balloon 1801, on the screen of the display 180. The setting menu includes setting buttons such as "security" and "power save". While setting buttons may be icons, the setting buttons and icons may be simply referred to as buttons.

FIG. 23C illustrates a case where the user A using the electronic whiteboard 1a does not perform any operation on the electronic whiteboard 1a for a predetermined time in the state illustrated in FIG. 23B. That is, the receiving unit 12a and the determination unit 15a of the electronic whiteboard 1a measure a time period from the time when the user operates the electronic whiteboard 1a for the last time. When the receiving unit 12a and the determination unit 15a determine that no operation is performed on the balloon 1801 even after a predetermined time elapses, the reception unit 12a and the determination unit 15a stop displaying the balloon 1801 and also stop displaying the setting button bse1 in thicker outline or highlighted. FIG. 23C illustrates an example screen, when no user operation is detected.

FIG. 23D is an example screen illustrating a process of capturing the screen of FIG. 23C in response to operation on the capture button bc2 by the user B1 or B2 at the electronic whiteboard 1b. In this case, since screen capturing is not prohibited by the user A at the electronic whiteboard 1a, the screen of the page 24/29 can be captured by the electronic whiteboard 1b in response to operation by the user B1 or B2.

At this time, the display control unit 14b displays the capture button bc2 in frame thicker outline (frame) or highlighted.

Prohibition of screen capturing illustrated in FIGS. 21C and 22C may be received from the user operating the electronic whiteboard 1a before the document image c11 is displayed. That is, the electronic whiteboard 1a may receive an instruction for prohibiting screen capturing from the user operating the setting button bse1 before a start of the event, such as the meeting, in which the document image c11 is used.

In the above-described embodiment, the information communication system 8a including the PC 2a and the electronic whiteboard 1a has been described as an example. However, the above-described embodiment can be similarly applied to the information communication system 8b including the PC 2b and the electronic whiteboard 1b.

As described above, at S204, the receiving unit 12a of the electronic whiteboard 1a receives an instruction to prohibit screen capturing, from the user operating the selection button displayed on the display 180. Subsequently, at S205, the storing and reading processing unit 19a stores and registers the confidential setting information and the confidential page information of the document image (video) in the confidential information management DB 1002a, based on information received at the receiving unit 12a. At S211, the communication unit 11a notifies the communication management system 5 of confidential setting information indicating prohibition of screen capturing, and confidential page number, so that the electronic whiteboard 1b can receive the information on prohibition of capturing.

More specifically, the electronic whiteboard 1b determines whether screen capturing is prohibited based on the confidential setting information, and controls screen capturing based on the determination.

Thus, even when the image displayed on the transmission source electronic whiteboard 1a is shared with the transmission destination electronic whiteboard 1b, it is possible to prevent inadvertent leakage and diffusion of confidential information due to screen capturing performed on the transmission destination electronic whiteboard 1b.

Second Embodiment

In the first embodiment, the user of the electronic whiteboard 1 directly operates the setting button bse1 to prohibit screen capturing. In the second embodiment, prohibition of screen capturing is set in advance in cooperation with a scheduler that manages event information of a meeting in which the electronic whiteboard 1 is used.

For example, the communication system of FIG. 1 is further provided with a generally known scheduler, such as a server that is communicably connected to the communication management system 5. Further, in cooperation with the confidential information management table (confidential information management DB5006) illustrated in FIG. 9B, the scheduler stores the document ID, the confidential setting information, and the confidential page number, which are associated with the meeting ID of the predetermined event (in this example, meeting) carried out by the electronic whiteboard 1a. With this system configuration, the electronic whiteboard 1a may acquire information on the confidentiality range and the confidential page number from the communication management system 5 in cooperation with the scheduler before an event such as a meeting is started. That is, prohibition of screen capturing may be set in advance before a start of the meeting, such as by registering various information on confidentiality in association with the schedule information of the event such as the meeting in which the image related to the image data is to be displayed.

As described above, in this embodiment, the electronic whiteboard 1a acquires information on the confidentiality range and the confidential page number from the communication management system 5 in cooperation with the scheduler before an event such as a meeting is started. That is, prohibition of screen capturing is set in advance before a start of the meeting, such as by registering various information on confidentiality in association with the schedule information of the event such as the meeting in which the image related to the image data is to be displayed. Accordingly, it is not necessary for a host, a user, or the like of an event such as a meeting to perform various operations in relation to prohibition of screen capturing during the meeting. This prevents inadvertent leakage and diffusion of confidential information, such that the users can concentrate on the meeting.

In the above-described embodiment, office equipment such as an electronic whiteboard has been described as an example of a communication terminal, however, the communication terminal in the present disclosure is not limited to the office equipment. Other examples of the communication terminal include a PC, a smartphone, a smartwatch, and a car navigation system. Further, the communication terminal includes a medical device. In a case where the communication terminal is a medical device, the document image is a patient image. In another example, the communication terminal may not include the display 180 as a display unit. That is, the communication terminal and the display 180 may be configured to be physically independent from each other, and the display content of the display 180 may be remotely controlled by the communication terminal.

Further, in the above embodiment, a case where the videoconference is performed by the communication system has been described. However, the present disclosure is not limited to this case and may be used for meetings, general conversations between family members, friends, remote diagnosis, or presentation of information in one direction.

In any one of the above-described embodiments, the PC 2 may be of any type as long as it is capable of transmitting video (image), audio, or the like, as a document image, to the electronic whiteboards 1a and 1b. For example, the PC 2 may be used as an external input device such as a smartphone or a tablet terminal.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A communication terminal for communicating with a counterpart communication terminal, comprising:
   circuitry configured to
   display an image based on image data to be shared with the counterpart communication terminal;
   receive an instruction to prohibit capturing of a screen that includes the image based on the image data;
   transmit to the counterpart communication terminal information related to the instruction to prohibit capturing of the screen; and
   store, in a memory, the information related to the instruction to prohibit capturing of the screen, in association with an identifier of the image data; wherein
   the information related to the instruction to prohibit capturing of the screen includes one of:
   an instruction to prohibit capturing of all screens displayed based on the image data; and
   an instruction to prohibit capturing of a part of screens based on the image data; and
   wherein the information related to the instruction to prohibit capturing of the screen further includes:
   page information identifying a page of the document image that is prohibited from screen capturing.

2. The communication terminal of claim 1, wherein the circuitry is configured to display, in addition to the image based on the image data, a user interface that allows a user to input the information related to the instruction to prohibit capturing of the screen including the image.

3. The communication terminal of claim 1, wherein the circuitry is further configured to display a stroke image, and
   the instruction to prohibit capturing, prohibits capturing of the screen that further includes the stroke image in addition to the image based on the image data.

4. The communication terminal of claim 1, wherein the circuitry receives the instruction to prohibit capturing, before the image is displayed or during when the image is being displayed.

5. The communication terminal of claim 1, wherein the circuitry is further configured to store the information related to the instruction to prohibit capturing, in association with schedule information of a particular event during which the image based on the image data is displayed.

6. A system comprising:
   a first communication terminal configured to display a first screen including an image based on image data; and
   a second communication terminal configured to display a second screen including the image based on the image data that is shared by the first communication terminal,
   the first communication terminal including first circuitry configured to:
   receive an instruction to prohibit capturing of a screen that includes the image based on the image data by the second communication terminal;
   transmit to the second communication terminal information related to the instruction to prohibit capturing of the screen, and
   store, in a memory, the information related to the instruction to prohibit capturing of the screen, in association with an identifier of the image data; wherein
   the information related to the instruction to prohibit capturing of the screen includes one of:
   an instruction to prohibit capturing of all screens displayed based on the image data; and an instruction to prohibit capturing of a part of screens based on the image data; and wherein the information related to the instruction to prohibit capturing of the screen further includes:

page information identifying a page of the document image that is prohibited from screen capturing, the second communication terminal including second circuitry configured to:

disable capturing of the screen that includes the image based on the image data, based on the information related to the instruction to prohibit capturing of the screen.

7. The system of claim 6, wherein the second circuitry of the second communication terminal is further configured to:

in response to a request for screen capturing, determine whether screen capturing is allowed, based on the information related to the instruction to prohibit capturing of the screen, and based on a determination indicating that screen capturing is allowed, execute capturing of the screen.

8. The system of claim 7, wherein the second circuitry of the second communication terminal is further configured to:

display a message indicating that capturing of the screen is prohibited, based on the determination indicating that screen capturing is not allowed.

9. The system of claim 7, wherein the second circuitry of the second communication terminal is further configured to store in the memory the information related to the instruction to prohibit capturing of the screen that is transmitted from the first communication terminal.

10. The system of claim 6, further comprising:

a server configured to store the image data transmitted from the first communication terminal, wherein the second communication terminal is configured to download the image data from the server for display.

11. A method for controlling capturing of an image, comprising:

displaying, on a display of a first communication terminal, an image based on image data to be shared with a second communication terminal;

at the first communication terminal, receiving an instruction to prohibit capturing of a screen that includes the image based on the image data;

transmitting, from the first communication terminal to the second communication terminal, information related to the instruction to prohibit capturing of the screen, to control screen capturing by the second communication terminal;

storing, in a memory, the information related to the instruction to prohibit capturing of the screen, in association with an identifier of the image data; wherein the information related to the instruction to prohibit capturing of the screen includes one of:

an instruction to prohibit capturing of all screens displayed based on the image data; and an instruction to prohibit capturing of a part of screens based on the image data; and wherein the information related to the instruction to prohibit capturing of the screen further includes:

page information identifying a page of the document image that is prohibited from screen capturing.

12. The method of claim 11, further comprising:

displaying, in addition to the image based on the image data, a user interface that allows a user to input the information related to the instruction to prohibit capturing of the screen including the image.

* * * * *